United States Patent

Ono et al.

[11] Patent Number: 5,872,905
[45] Date of Patent: Feb. 16, 1999

[54] RECORDING AREA MANAGEMENT METHOD, ERROR RECOVERY PROCESSING METHOD, AND STORAGE APPARATUS

[75] Inventors: Hitoshi Ono, Hirakata; Toshikazu Koudo, Nishinomiya; Yasushi Ayaki, Neyagawa; Yoshiki Kuno, Osaka, all of Japan

[73] Assignee: Matsushita Electric Industrial Co., Ltd., Osaka-Fu, Japan

[21] Appl. No.: 811,484

[22] Filed: Mar. 5, 1997

[30] Foreign Application Priority Data

Mar. 14, 1996 [JP] Japan .................................. 8-057483
Oct. 23, 1996 [JP] Japan .................................. 8-281120

[51] Int. Cl.⁶ .................................................. G06F 12/00
[52] U.S. Cl. ...................................... 395/182.03; 711/100
[58] Field of Search ...................... 395/182.03, 182.04; 711/100; 707/1

[56] References Cited

U.S. PATENT DOCUMENTS

| 5,452,418 | 9/1995 | Tatosian | 711/117 |
| 5,535,399 | 7/1996 | Blitz | 395/182.04 |
| 5,574,907 | 11/1996 | Jernigan | 395/601 |
| 5,649,203 | 7/1997 | Sites | 395/709 |

FOREIGN PATENT DOCUMENTS

| 1-236488 | 9/1989 | Japan . |
| 7-111035 | 4/1995 | Japan . |
| 7-200369 | 8/1995 | Japan . |

*Primary Examiner*—Eric Coleman
*Attorney, Agent, or Firm*—Panitch Schwarze Jacobs & Nadel, P.C.

[57] ABSTRACT

The present invention is directed to the provision of a storage apparatus using a recording area management method and an error recovery processing method suitable for processing moving picture data and the like, wherein empty areas are registered separately in an empty area list for high-speed processing and an empty area list for low-speed processing according the classification made based on the result of comparing the length of each empty area with a minimum area length, and in the event of an error occurrence, a remaining time available for error processing is estimated from the difference between the time required to execute accumulated record or read requests and a limit time, and an error processing method, from among a plurality of error processing methods requiring different lengths of time for processing, is selected and carried out according to the remaining time.

22 Claims, 24 Drawing Sheets

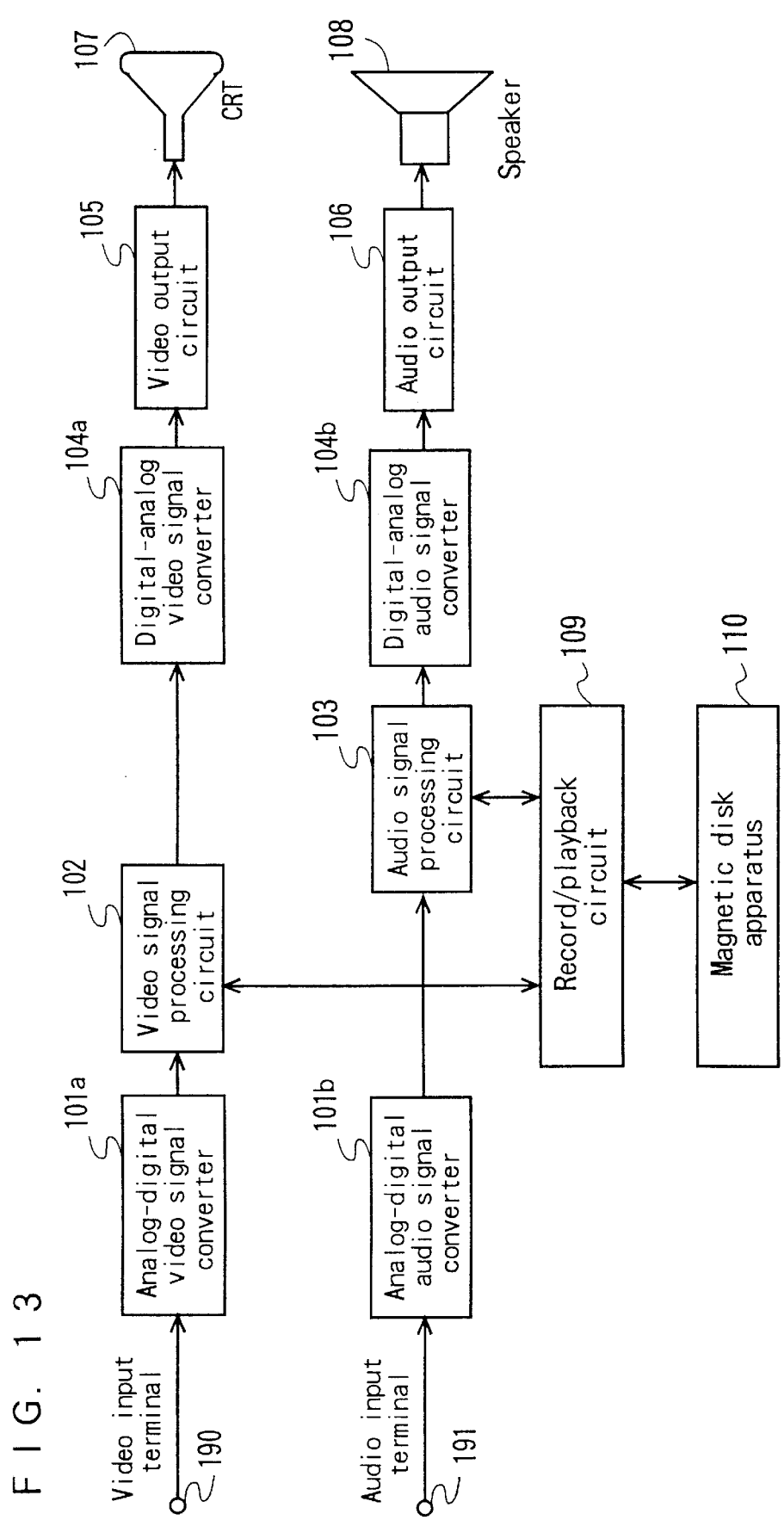
F I G. 1 3

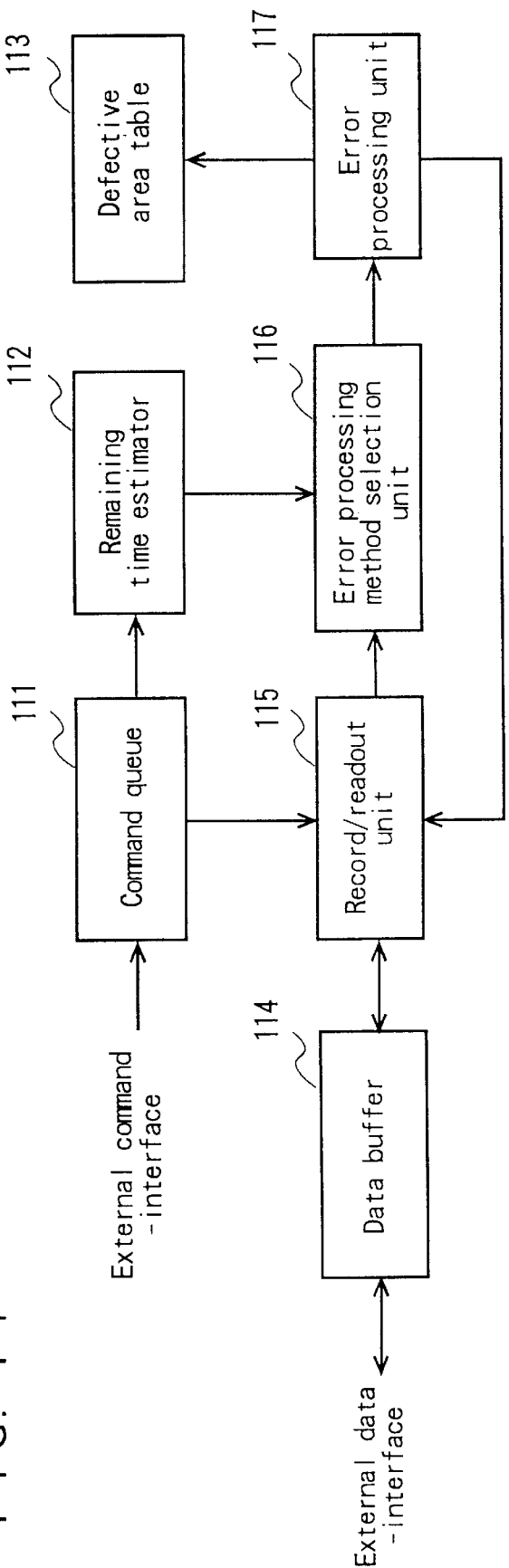
F I G. 14

F I G. 15

| | Operation | First sector | Number of sector |
|---|---|---|---|
| 137 | read | 10000 | 100 |
| 138 | write | 220000 | 100 |
| 139 | read | 30100 | 100 |
| 140 | write | 421000 | 100 |
| | | | |

F I G. 18

| | Operation | First sector | Number of sector | Error processing level |
|---|---|---|---|---|
| 146 | read | 10000 | 100 | 3 |
| 147 | write | 220000 | 100 | 2 |
| 148 | read | 30100 | 100 | 3 |
| 149 | write | 421000 | 100 | 2 |
| | | | | |

F I G. 20
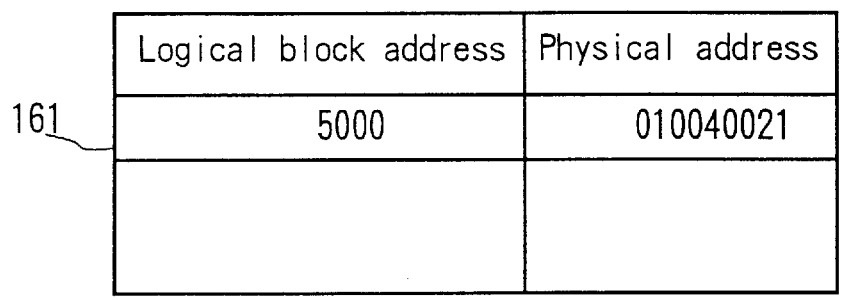

RECORDING AREA MANAGEMENT METHOD, ERROR RECOVERY PROCESSING METHOD, AND STORAGE APPARATUS

BACKGROUND OF THE INVENTION

The present invention relates to a method for managing recording areas, which is suitable for application for the recording and playback of data, such as moving picture data, that needs to be recorded or read out at high speed in a prescribed cycle, and more particularly to a method for managing fragmented areas, a method for processing error recovery, and a storage apparatus using these methods.

Fragmented area management methods employed in a conventional storage apparatus will be described first.

In a recording apparatus for reading and writing data on a recording medium, such as a magnetic disk or an optical disk, with a read/write head moving relative to the recording medium, there occurs a time interval during which read/write operations cannot be performed, for example, when the read/write head is being moved for positioning or when the read/write head is waiting for the desired data to rotate beneath it.

One example of the conventional magnetic disk apparatus will be described with reference to FIG. 23, which is a schematic plan view showing a magnetic disk, etc. in the conventional magnetic disk apparatus.

In FIG. 23, the magnetic disk 182 is a magnetic recording medium on which data are recorded as magnetizations. A head 188 converts an electrical signal into a magnetic field, or a magnetic field into an electrical signal, to record data on the magnetic disk 182 or to read data on the magnetic disk 182. An arm 187 supports the head 188 thereon and moves it across the surface of the magnetic disk 182. Tracks 183 are concentric circles into which the surface of the magnetic disk 182 is divided, each track 183 serving as a unit of storage area. Each track 183 is divided into sectors 184 of equal size which also serve as storage area units, each sector 184 being the smallest access unit of the magnetic disk 182.

The tracks 183 are labelled with track numbers starting from the innermost or outermost track, while the sectors 184 within each track 183 are assigned sector numbers. Any storage area on the magnetic disk can therefore be identified by the track number and sector number, such as "sector 5" on "track 2". In the magnetic disk apparatus, data can be accessed on a sector-by-sector basis, which means that when a file consists of a plurality of sectors, all the sectors constituting the file are not necessarily contained within one track or stored sequentially in contiguous tracks. In an extreme case, there can occur a file consisting of a sector located in the outermost track and a sector located in the innermost track.

To read data recorded on the magnetic disk 182 having the above-mentioned configuration, first the head 188 moves to the track containing the sector where the desired data is recorded. Next, the head 188 waits for the specified sector to be brought beneath the head 188 by the rotation of the magnetic disk 182, and then reads out the data recorded on that sector. At this time, if the next data to read is located in an adjacent sector, the data can be read continuously without moving the head 188 and without a rotational delay. In contrast, if the data stored are scattered over non-contiguous sectors or fragmented, the three-step process consisting of moving the head 188, waiting for disk rotation, and reading out data must be repeated for each sector. Accordingly, when reading data in non-contiguous sectors, the time required to move the head 188 and the rotational delay add to the data non-readable time, as compared when reading data in contiguous sectors.

On the other hand, when recording a sequence of data on the magnetic disk 182, the data are recorded by finding empty sectors contiguous to each other or available in ascending order of track and sector numbers. As recording and erasing operations are repeated on the magnetic disk 182, the empty areas become fragmented into smaller areas; when data are recorded in such fragmented areas, the read/write speed of the storage apparatus slows, degrading the overall performance of the storage apparatus.

With regard to this problem, a number of methods for managing recording areas have been proposed that are aimed at preventing disk read/write speed from slowing down even if recording and erasing operations are repeated, and thus ensuring full performance of the storage apparatus.

In one such method, areas constituting files and empty areas are managed using a plurality of continuous areas, and one example of this method is disclosed in the gazette of the Japanese unexamined patent application, (TOKKAI) Hei 1-236488. The recording area management method disclosed in the gazette of the Japanese unexamined patent application, (TOKKAI) Hei 1-236488, is applicable for a storage apparatus that uses a rewritable optical disk. According to the storage apparatus of this prior art, to record a file in a single continuous area, each continuous area is managed using its start and end positions or its length, and based on the size of the file to be recorded, a search is made for an empty area long enough to record the file; it is claimed that this simplifies the area management and achieves high-speed read/write operations.

Furthermore, an example of a storage apparatus that ensures storing each file in contiguous empty areas is disclosed in the gazette of the Japanese unexamined patent application, (TOKKAI) Hei 7-200369. In the storage apparatus of this prior art, file reallocation is performed in which any file located after an empty area is moved forward to fill the empty area, thereby moving the empty area rearward. According to the storage apparatus disclosed in the gazette of the Japanese unexamined patent application, (TOKKAI) Hei 7-200369, it is claimed that, by evaluating the time required for the file reallocation and the size of the resulting contiguous empty areas, effective file reallocation is achieved to secure contiguous empty areas.

The conventional storage apparatus disclosed in the gazette of the Japanese unexamined patent application, (TOKKAI) Hei 1-236488, which is designed to record data by searching empty area management information for an empty area long enough to record the data, has had the problems that it requires a search time before starting the recording, and also that the method cannot be applied unless the size of the file to be recorded is known in advance.

Further, the conventional storage apparatus disclosed in the gazette of the Japanese unexamined patent application, (TOKKAI) Hei 7-200369, which is designed to secure contiguous empty areas by performing file reallocation, has had the problem that the time required to evaluate the efficiency of reallocation and to reallocate the files increases as the magnetic disk capacity increases.

Next, error recovery processing methods employed in the conventional storage apparatus will be described.

Storage apparatus capable of random accessing, such as magnetic disk and optical disk apparatus, have built-in error recovery functions in order to improve recording or readout reliability. Such error recovery functions include, for example, a retry process in which a record or read operation is retried on an area where an error has occurred, and a reassignment process in which a logical block address previously assigned to an error area is reassigned to another area and data on this is registered in a defective area table to inhibit the use of the error area.

These error recovery processes, however, have had the problem that they are not suitable for real-time processing since the processing for error recovery takes long time compared to read/write operations, and in the case of the retry process, the completion time of the processing cannot be estimated because the same process is repeated.

One example of the conventional magnetic disk recording apparatus will be described with reference to FIG. 24. FIG. 24 is a plan view showing in schematic form the configuration of the conventional magnetic disk here, the parts identical in configuration and function to those shown in FIG. 23 are designated by the same numerals.

In FIG. 24, the recording surface of the magnetic disk 182 as a magnetic recording medium is divided into concentric circles, thus forming a plurality of tracks 183 as storage area units. Each track 183 consists of a plurality of sectors 184 each of which is the smallest access unit. The head 188 records data on the magnetic disk 182, or reads out data on the magnetic disk 182. The arm 187 has the function of supporting the head 188 thereon and moving it across the surface of the magnetic disk 182.

Each sector 184 is assigned a logical block address 185 which is a logical area number. An alternate sector 186 is a sector used in place of the sector 184 in the event of a failure of the latter. Since each sector 184 has the logical block address 185 as a logical area number, any storage area on the magnetic disk 182 can be identified by the logical block address 185.

To read data recorded on the magnetic disk 182 having the above-mentioned configuration, first it is determined to which sector on which track the sector 184 holding the data specified by the logical block address 185 corresponds.

Next, the head 188 is moved to the track 183 containing the thus determined sector. The head 188 moved to the specified track 183 waits until the specified sector 184 is brought beneath the head 188 by the rotation of the magnetic disk 182, and then reads out the desired data.

When recording data also, the head 188 is moved to the empty sector 184 specified by the logical block address 185, as in the above-mentioned read operation, and records the data on that sector.

If an error occurs when recording or reading at the logical block address 185, the recording or reading operation is retried after slightly shifting the position of the head 188. This retry operation is repeated a prescribed number of times until proper recording or reading is done.

If recording cannot be done on the specified sector 184 after repeating the retry operation, a reassignment operation is performed by first reassigning the logical block address 185 originally assigned to the error sector 184 to the alternate sector 186 and then performing a record operation on the alternate track 186. In the read operation, if the data can be read out after repeating the retry operation the prescribed number of times, a reassignment operation is performed by first copying the data held in the sector 184 to the alternate sector 186 and then reassigning the logical block address 185 originally assigned to the error sector 184 to the alternate sector 186.

In the above-mentioned error recovery process, not only a rotational delay occurs while waiting for the head 188 to arrive at the position of the specified sector, but also the head 188 is being moved back and forth. The error recovery thus takes time for processing compared to a normal operation, rendering the method unsuitable for an apparatus that requires high-speed processing such as real-time processing.

To overcome the above-mentioned problem, there has been proposed a storage apparatus which is disclosed in the gazette of the Japanese unexamined patent application, (TOKKAI) Hei 7-111035. The storage apparatus disclosed in this publication is constructed in such a manner that a single recording area is divided into areas for recording data that requires high reliability and areas for recording data that requires high processing speed rather than reliability, and the error recovery processing method is switched between different modes according to the type of recording area.

It is proposed that this conventional storage apparatus be used as an apparatus for continuously recording large volumes of data such as video signals, by switching the record/playback operations between a mode that gives priority to data reliability and a mode that omits error recovery operations and gives priority to high-speed processing, according to the position and attribute of the recording areas, for example, management areas and data areas.

However, in the conventional storage apparatus (Hei 7-111035), since the configuration involves dividing the recording area and changing error processing modes for each recording area, the mode of record/playback operation is selected based on the position and attribute of each recording area, without regard to the present load of the recording/playback apparatus. As a result, when the load of the record/playback operation varies, the mode of record/playback operation is always selected by assuming the heaviest load condition. This has presented a problem in that error recovery is not performed even when the load is light and error recovery can be performed.

The entire disclosure of the Japanese Patent Applications No. Hei 1-236488, Hei 7-200369 and Hei 7-111035 including specification, claims, drawings and summary are incorporated herein by reference in its entirety.

BRIEF SUMMARY OF THE INVENTION

To overcome the above-mentioned problems associated with the fragmented area management methods employed in the conventional storage apparatus, it is an object of the present invention to provide a storage apparatus that eliminates the need for reallocation of files and searching for empty areas, and that can reduce the time interval during which data reading or writing cannot be done because of the head movement and the waiting time for disk rotation. It is also an object of the present invention to provide a recording area management method and an error recovery processing method for use with the storage apparatus.

To achieve the above-mentioned objects, the present invention provides a recording area management method for managing a file list which is used to identify a file consisting of a series of data clusters, a data area list which is a list of position information of a plurality of areas holding the data clusters constituting the file, a first empty area list which is a list of position information of empty areas where no data are stored, and a second empty area list which is a list of position information of empty areas not included in the first empty area list. The recording area management method comprising:

an area length comparing step in which the length of an empty area in the first empty area list or the second empty area list is compared with a predetermined minimum area length; and a registration step in which the empty area is registered in the first empty area list or the second empty area list in accordance with the result of comparing the length of the empty area with the minimum area length in the area length comparing step.

In this way, according to the recording area management method of the present invention, empty areas of long area length and empty areas of short area length are used selectively according to the speed required for data reading or writing, and contiguous empty areas are classified according to their lengths and registered in different empty area lists for management, thus making it possible to record data requiring high-speed reading or writing in empty areas of long area length and data not requiring high-speed reading or writing in empty areas of short area length, and consequently achieving high-speed read/write operations.

The present invention also provides an error recovery processing method comprising the steps of:

accumulating a plurality of record requests or read requests;

recording data on or reading data from a recording medium in accordance with the accumulated record or read requests;

in the event of a data read error or record error, estimating a remaining time available for error processing from the time required to execute the accumulated record or read requests; and selecting an error processing method according to the estimated remaining time from among a plurality of error processing methods requiring different lengths of time for error processing, and carrying out the selected error processing method.

According to the error recovery processing method of the present invention, after accumulating a plurality of record requests or read requests, data is read from or recorded on a recording medium in accordance with the accumulated requests, and if an error occurs in data reading or recording, the remaining time available for error processing is estimated from the time required to execute the accumulated requests, and an error processing method is selected according to the estimated remaining time from a plurality of error processing methods requiring different lengths of time for processing, thereby carrying out necessary error processing without fail in a record/readout process. In this way, according to the error recovery processing method of the present invention, a highly reliable defective area management method can be provided.

The present invention also provides a storage apparatus in which the error recovery processing method is carried out, comprising:

request accumulating means for accumulating a plurality of record or read requests;

recording/reading means for recording data on or reading data from a recording medium in accordance with the record requests or read requests accumulated in the request accumulating means;

remaining time estimating means for estimating a remaining time available for error processing from the time required to execute the record or read requests accumulated in the request accumulating means; and error processing carrying out means capable of selectively carrying out an error processing method according to the remaining time estimated in the remaining time estimating means from among a plurality of error processing methods requiring different lengths of time to process a read error or record error occurring in the recording/reading means.

In this way, since error recovery processing is performed by considering not only the position and attribute of a recording area but also the remaining time estimated from the record requests or read requests and available for error processing, the storage apparatus of the present invention has features combining high reliability with high-speed processing capability.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWINGS

FIG. 13 is a block diagram showing in schematic form the configuration of a television receiver using a storage apparatus according to a third embodiment of the present invention;

FIG. 14 is a block diagram showing in schematic form the configuration of the storage apparatus according to the third embodiment;

FIG. 15 is a diagram for explaining one example of a command queue according to the third embodiment;

FIG. 18 is a diagram for explaining one example of a command queue according to the fourth embodiment;

FIG. 20 is a diagram showing one example of a temporary defective area table according to the fifth embodiment;

DETAILED DESCRIPTION OF THE INVENTION

The preferred embodiments of the storage apparatus of the present invention will be described below with reference to the accompanying drawings.

<<Embodiment 1>>

Figure 1:
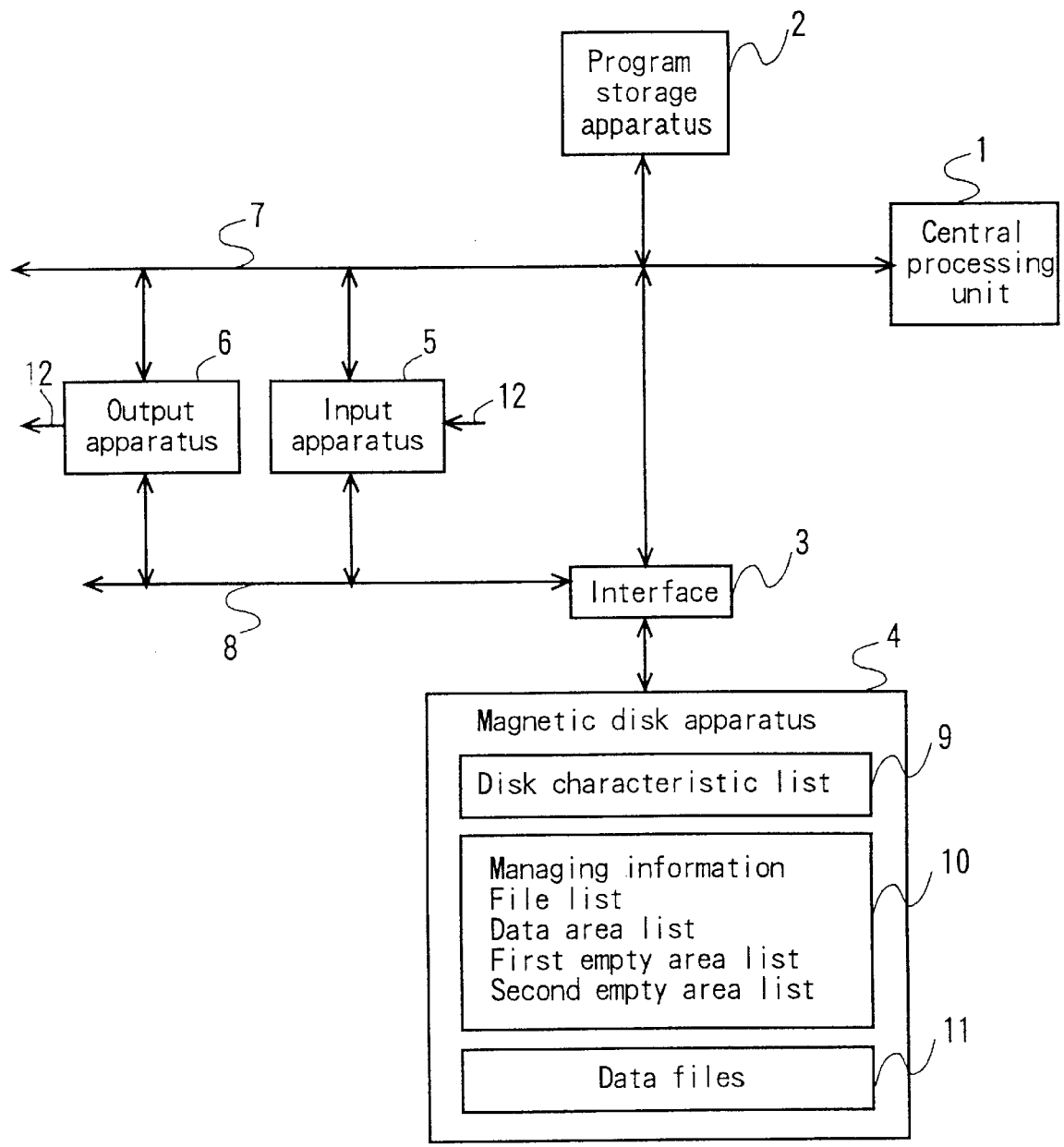
FIG. 1 is a block diagram showing a storage apparatus according to a first embodiment of the present invention.

FIG. 1 is a block diagram showing a video recording apparatus as a storage apparatus implementing a recording area management method according to a first embodiment.

As shown in FIG. 1, the video recording apparatus of the first embodiment comprises a central processing unit 1, a program storage apparatus 2, a magnetic disk apparatus 4; an input apparatus 5, and an output apparatus 6. The magnetic disk apparatus 4 is connected to the central processing unit 1, input apparatus 5, output apparatus 6, etc. via an interface 3. A video signal 12 is input to the input apparatus 5 where the input video signal 12 is quantized. The output apparatus 6 converts the quantized video signal into the video signal 12 for output. In FIG. 1, reference numeral 7 indicates a bus for transferring signals from the central processing unit 1, and reference numeral 8 designates a dedicated bus for transferring the quantized video signal between the magnetic disk apparatus 4, the input apparatus 5, and the output apparatus 6.

[23]

The magnetic disk apparatus 4 holds a disk characteristic list 9, management information 10, and data files 11. The disk characteristic list 9 holds various characteristic values of the magnetic disk apparatus, such as maximum number of sectors, maximum value of head seek time, waiting time per revolution, data read/write access time, etc. The management information 10 is used to manage data storage allocations within the magnetic disk apparatus, and consists of a file list, a data area list, a first empty area list, a second empty area list, etc. The disk characteristic list 9 is stored in a nonvolatile memory within the magnetic disk apparatus, while the management information 10 and the data files 11 are stored on a magnetic disk.

The various apparatus constituting the video recording apparatus of the first embodiment are controlled by the central processing unit 1 using programs stored in the program storage apparatus 2, and the recording and playback operations of the video signal 12 and management of recording areas are thus performed.

Next, a signal flow will be described that occurs when recording the video signal 12 on the magnetic disk apparatus 4.

The video signal 12 is quantized in the input apparatus 5 continuously without any breaks. The quantized video signal is transferred on the dedicated bus 8, fed into the magnetic disk apparatus 4 via the interface 3, and recorded in a data file 11.

Conversely, when playing back the video signal 12, the data file 11 stored in the magnetic disk apparatus 4 is read out. The readout data file 11 is transferred on the dedicated bus 8 and fed into the output apparatus 6 via the interface 3. The output apparatus 6 converts it into the video signal 12 for output.

Figure 2:
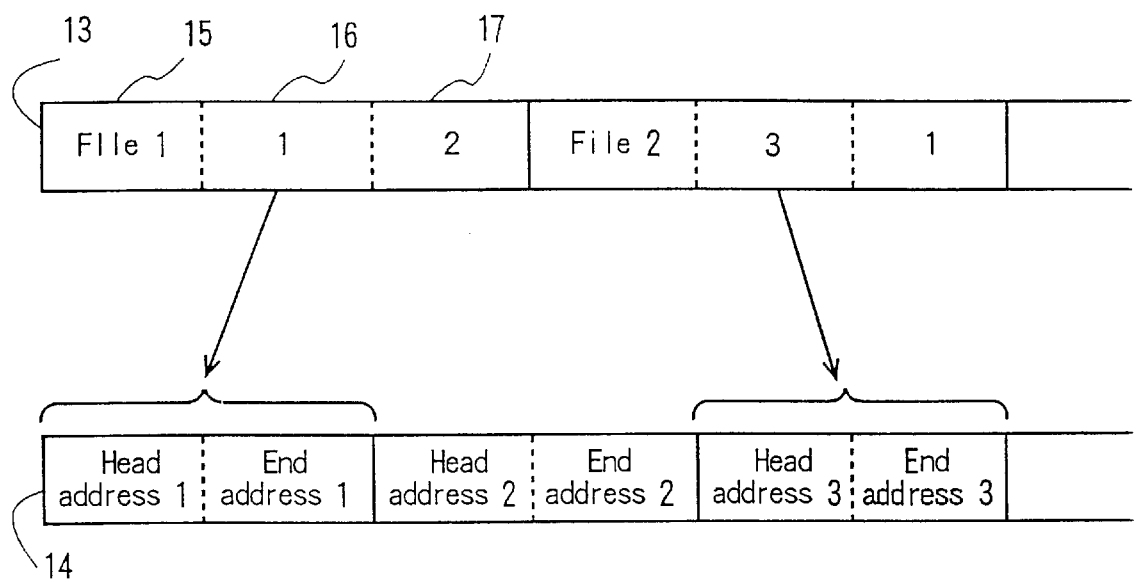
FIG. 2 is a diagram for explaining an example of management information according to the first embodiment.

Next, the management information 10 used to manage data storage allocations within the magnetic disk apparatus 4 will be described with reference to FIG. 2. FIG. 2 is a diagram for explaining by way of example the structures of the file list 13 and the data area list 14 in the management information 10.

In the file list 13, file name 15 is a file identifier for identifying a file, and the field indicated by reference numeral 16 carries the location of the starting area among the plurality of areas constituting the file. The field indicated by reference numeral 17 carries the number of areas constituting the file. The file list 13 holds file information on all individual files stored in the magnetic disk apparatus 4. The file information, as mentioned above, consists of the file name 15, the location of the starting area 16 among the areas constituting each file, and the number of areas 17.

The data area list 14 holds data area information consisting of a head address and an end address for each of the areas constituting each individual file recorded in the magnetic disk apparatus 4. In the example shown in FIG. 2, file 1 consists of two areas, that is, the first and second areas in the data area list 14, the first area being the starting area. File 2 consists only of one area, that is, the third area in the data area list 14, the third area thus being the starting area. The first area in the data area list 14 is specified by the head address 1 and end address 1. Likewise, the second area in the data area list 14 is specified by the head address 2 and end address 2, and the third area in the data area list 14 is specified by the head address 3 and end address 3.

Though not shown in the figure, the first empty area list and the second empty area list in the management information 10 have the same structure as the data area list 14, and each holds a plurality of empty area information sections each consisting of a head address and an end address of an empty area.

Next, the recording area management method of the first embodiment using the above-mentioned management information 10 will be described with reference to FIGS. 3 to 5.

Figure 3:
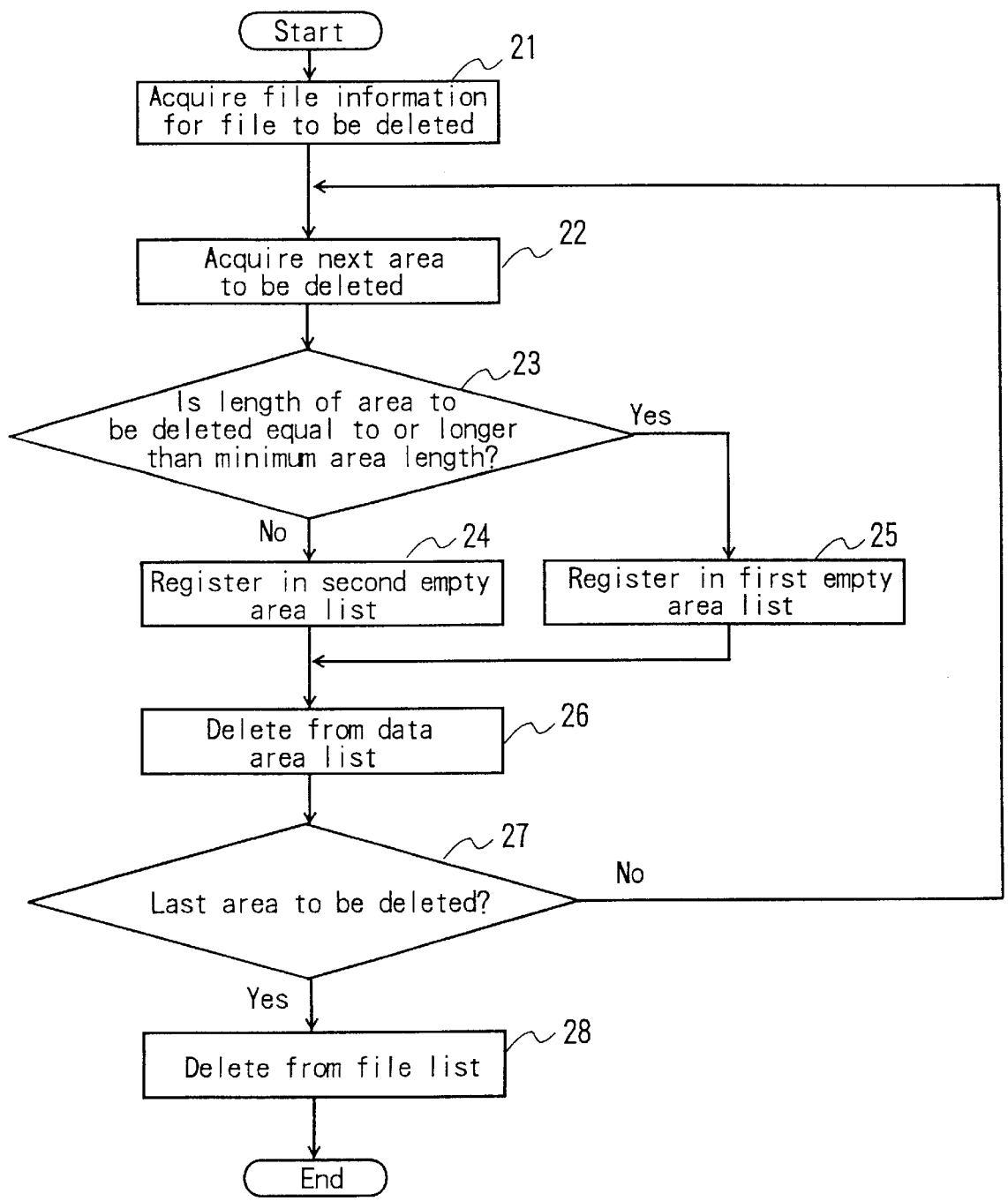
FIG. 3 is a flow chart illustrating a file deletion process flow according to the first embodiment.

FIG. 3 is a flow chart illustrating a file deletion process flow according to the first embodiment. FIGS. 4 and 5 are schematic diagrams showing data storage allocations on the magnetic disk before and after the file deletion process. In FIGS. 4 and 5, reference numeral 66 indicates the file list, 67 the data area list, 68 the first empty area list, and 69 the second empty area list. In the file list 66, reference numerals 51 to 54 indicate file information stored in the file list 66. In the data area list 67, reference numerals 56 to 60 indicate data area information stored in the data area list 67. Reference numerals 63 and 64 in the first empty area list 68 indicate empty area information stored in the first empty area list 68, and reference numeral 65 in the second empty area list 69 indicates empty area information stored in the second empty area list 69.

The operation of the file deletion process according to the first embodiment will be described below with reference to FIGS. 3, 4, and 5.

Figure 4:
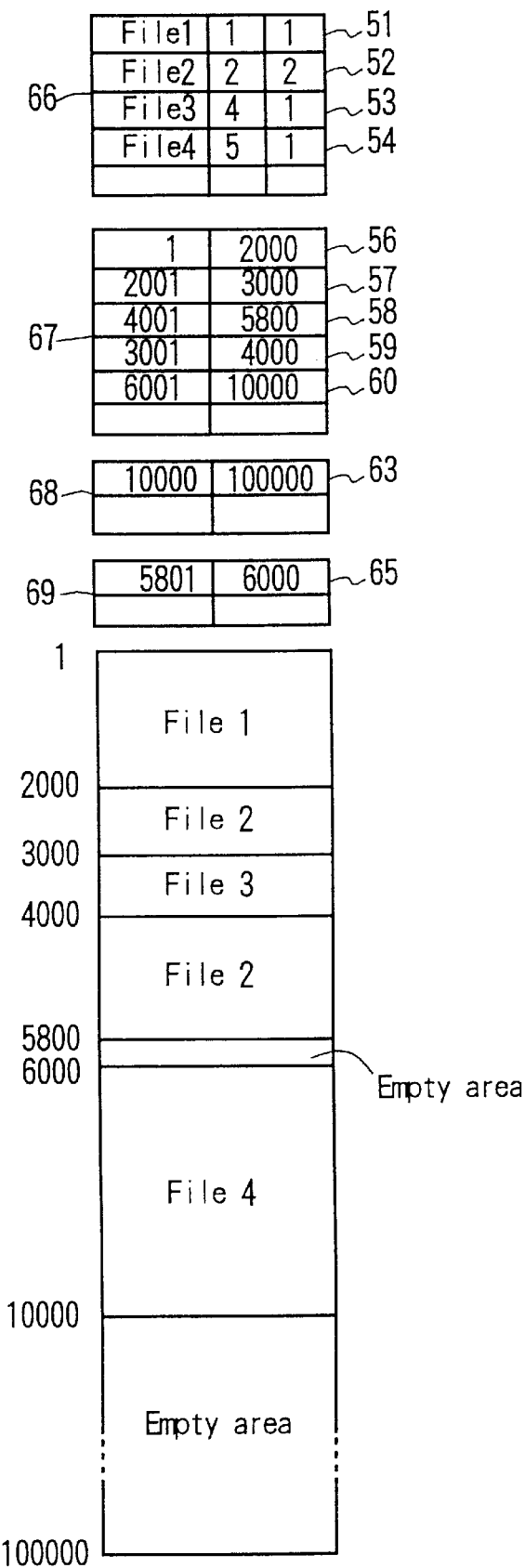
FIG. 4 is a schematic diagram showing a data storage allocation according to the first embodiment.

With the data storage allocation on the magnetic disk as shown in FIG. 4, when a command is issued to delete File 3, the file deletion process shown in FIG. 3 is invoked.

In process step 21 in FIG. 3, information on the location of the starting area and the number of areas of File 3 is retrieved from the file information 53 labelled with the file name File 3 in the file list 66.

Next, since the location of the starting area of File 3 shown in FIG. 4 is "4", in process step 22 in FIG. 3 the head address and end address are retrieved from the fourth data area information 59 in the data area list 67.

In decision step 23 in FIG. 3, the length of the area is computed from the end address and head address, and then compared with a minimum area length. The minimum area length here is a reference length used to distinguish each area by its length and switch the processing mode in order to secure an effective transfer rate considering access time. If the minimum area length is 500, for example, the length of the area to be deleted, which is 1000, is longer than the minimum area length. Accordingly, in process step 25, the head address and end address are entered as they are into the first empty area list 68. The first empty area list 68 now holds the empty area information 63 and 64, as shown in FIG. 5.

Figure 5:
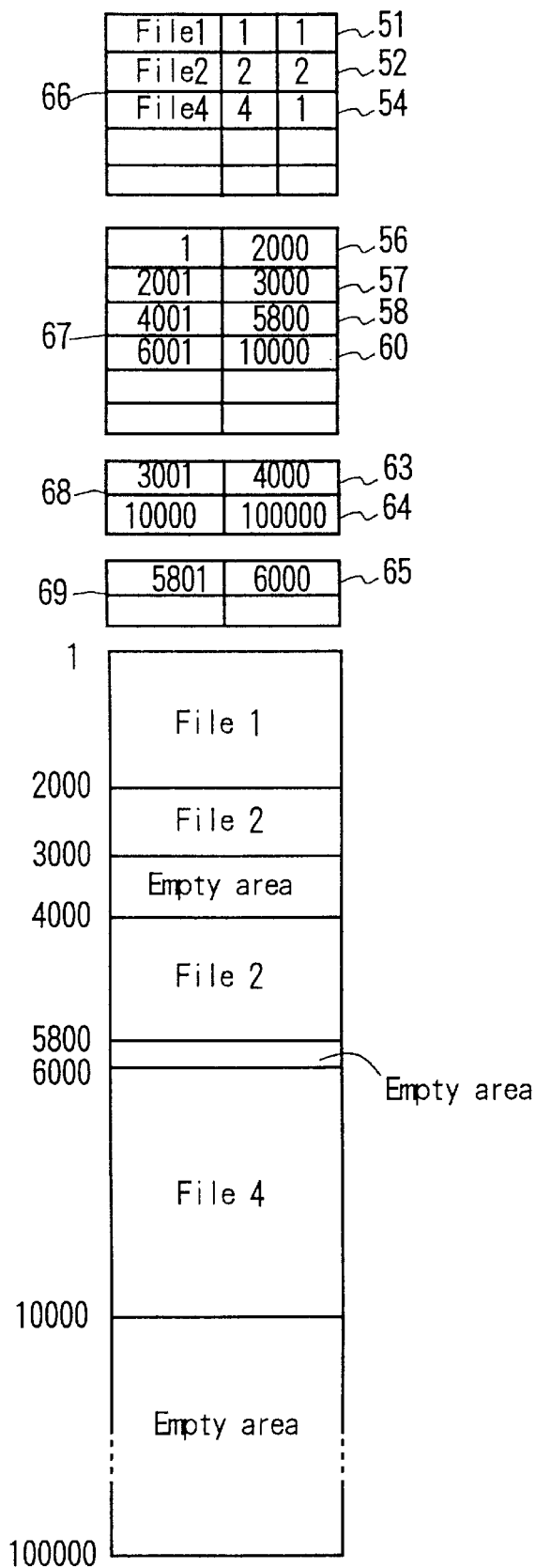
FIG. 5 is a schematic diagram showing a data storage allocation according to the first embodiment.

Further, in process step 26 in FIG. 3, the fourth data area information 59 is deleted from the data area list 67, after which the fifth data area information is moved forward to fill the empty space created by the deletion; the result is the data area list 67 shown in FIG. 5.

Next, in decision step 27, 1 is subtracted from the number of areas of File 3 to compute the number of areas remaining to be processed, and the result is substituted for the number of areas of File 3, based on which a decision is made as to whether there remains any area yet to be processed. If there is an area remaining to be processed, the process returns to process step 22, and the process from process step 22 through decision step 27 is repeated. In the illustrated example, the number of areas of File 3 is 1, and therefore, 1 minus 1 is 0, leaving no areas remaining to be processed. As a result, in process step 28, the file information 53 (FIG. 4) for File 3 is deleted, and the file information 54 for File 4 is moved forward to fill the space, as shown in the file list 66 in FIG. 5. Then, the starting area location of each file is updated to match the updated data area list 67, as shown in FIG. 5, upon which the deletion process for File 3 is terminated.

Next, the method of minimum area length calculation used in the above-mentioned deletion process will be described with reference to FIG. 6.

Figure 6:
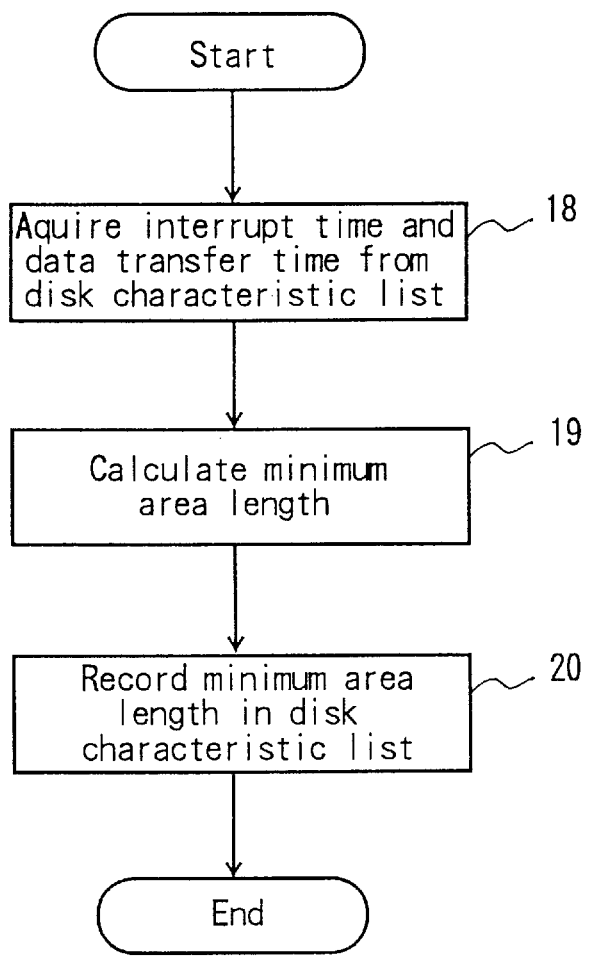
FIG. 6 is a flow chart illustrating a process flow for calculating a minimum area length according to the first embodiment.

FIG. 6 is a flow chart illustrating the process for minimum area length calculation. When an instruction is issued to calculate the minimum area length at the time of initializing a magnetic disk, the minimum area length calculation process shown in FIG. 6 is invoked.

In process step 18, the maximum value of access time and the data write or read speed are acquired from the disk characteristic list 9 of the magnetic disk apparatus 4. Using the acquired information, the minimum area length is calculated in process step 19, and the calculated minimum area length is recorded in the disk characteristic list 9 in process step 20.

The minimum area length calculation process in process step 19 is invoked at the time of initializing the magnetic disk, and the obtained value is recorded in the disk characteristic list 9. Thereafter, the minimum area length recorded in the disk characteristic list 9 is referenced.

The equation used in the calculation process in process step 19 will be explained below. The minimum area length here is obtained as a minimum value of data amount L that satisfies the following equation (1):

$$L/Vs \geq T + L/Vd \qquad (1).$$

In equation (1), Vs is the signal processing speed at which the video signal 12 input to the input apparatus 5 (FIG. 1) is quantized, or the signal processing speed at which the quantized video signal is converted by the output apparatus 6 into the video signal 12, Vd is the data write or read speed of the magnetic disk apparatus 4, and T is the maximum value of the access time of the magnetic disk apparatus 4, which is the sum of the time required for the head to move from the outermost track to the innermost track and the time required to wait for one complete revolution of the disk.

In equation (1), the time shown on the left-hand side, which is required for the input apparatus 5 or the output apparatus 6 to process data of data amount L, that is, the maximum time that can be spent for the transfer of the data of data amount L from the input apparatus 5 to the magnetic disk apparatus 4 or from the magnetic disk apparatus 4 to the output apparatus 6, has been used as the maximum processing time used for the calculation of the minimum area length. The right-hand side shows the sum of the maximum value of the access time required for the head of the magnetic disk apparatus 4 to move to the target area and wait for the disk revolution and the time required to write or read the data of data amount L. Accordingly, when data is recorded in contiguous areas having a total length equal to or greater than the minimum area length represented by the minimum value of data amount L that satisfies the above-mentioned equation (1), or when contiguous empty areas having a total length equal to or greater than the minimum area length are available, the read or write time of the magnetic disk apparatus 4 is always inside of the maximum processing time, so that there cannot occur the situation where the data input/output of the magnetic disk apparatus 4 cannot catch up with the signal processing at the input apparatus 5 or output apparatus 6.

Since the data write or read speed Vd of the magnetic disk apparatus 4 and the time T required for the head to move from the outermost track to the innermost track are values inherent in the magnetic disk apparatus 4, these values are measured in advance and recorded in a specific area on the magnetic disk. Accordingly, if the magnetic disk apparatus is replaced by a new one, the minimum area length matched to the new magnetic disk apparatus can be set by using the values stored in the new magnetic disk apparatus.

The method of measuring the maximum value of access time and the data write or read speed in the first embodiment will be described next.

First, a description will be given of how the maximum value of access time is measured.

To begin with, the head is moved to a specific area on the magnetic disk, for example, to the sector with a logical block address 0 which is one of the numbers assigned to the individual sectors on the magnetic disk, and that position is set as the origin.

Next, a command is issued to move the head from the origin to another sector, and the process waits until an operation completion notification is received. The time of the command issuance and the time of the reception of the operation completion notification are acquired, and the access time is determined from the difference between these times. Measurements are made by repeating the above-mentioned operation with respect to all sectors other than the sector at the origin, and the maximum value of the access time is thus determined.

Next, a description will be given of how the data write or read speed is measured.

First, the head is moved to the track where a measurement is to be made. Next, a command is issued to write or read a prescribed amount of data, for example, data of one sector, and the processing time is measured. This operation is repeated several times, and the average is taken to compute an average processing time. Since this average processing time includes the rotational delay time, an average rotational delay time, i.e., the time required for the disk to make a half revolution, is subtracted from the average processing time, thereby obtaining the time required to write or read the data. Then, the write or read speed is computed from the amount of data written or read out. The operation up to this point is performed on each track, and the slowest speed is obtained. This speed is determined as the data write or read speed.

Figure 7:
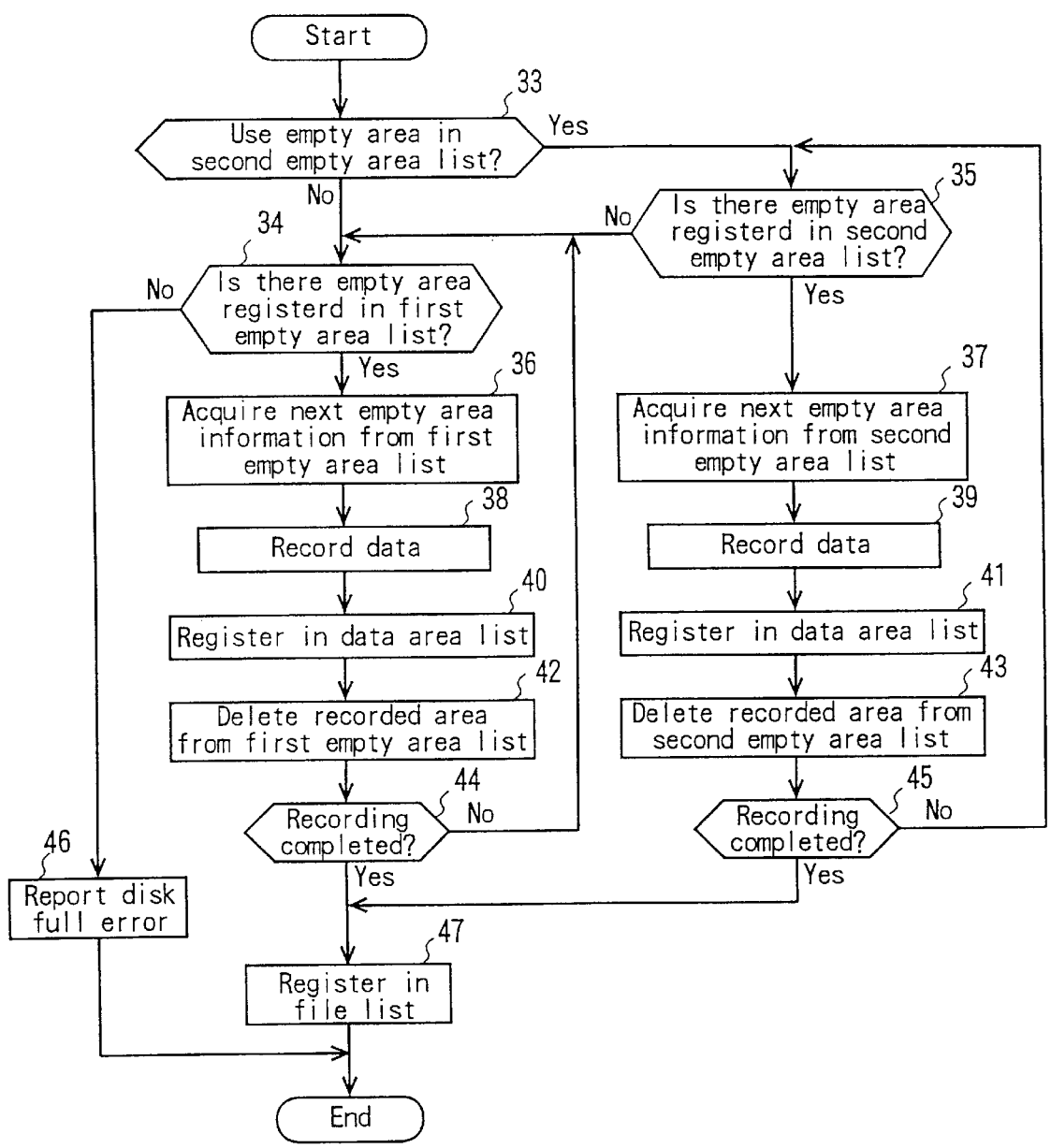
FIG. 7 is a flow chart illustrating a file storage process flow according to the first embodiment.

Next, the operation of a file storage process according to the first embodiment will be described with reference to FIG. 7. FIG. 7 is a flow chart illustrating the flow of the file storage process according to the first embodiment.

With the data storage allocation on the magnetic disk as previously shown in FIG. 5, when a data store command is issued with a file identifier of File 5, the data storage process shown in FIG. 7 is invoked.

In decision step 33 in FIG. 7, a decision is made as to whether the data to be stored as File 5 is data that should be stored in an empty area of short area length registered in the second empty area list 69. If the data is the one that should be stored in an empty area registered in the second empty area list 69, then a decision is made in decision step 35 as to whether there is an empty area registered in the second empty area list 69. If it is decided in this decision step 35 that there is an empty area registered, the data is stored in that empty area. On the other hand, if there is no empty area registered, the branch to decision step 34 is followed.

On the other hand, if it is decided in decision step 33 that the data to be stored is not data that should be stored in an empty area of short area length registered in the second empty area list 69, which means that the data is data that should be stored in an empty area of long area length registered in the first empty area list 68, then in decision step 34 it is examined whether there is an empty area registered in the first empty area list 68.

For example, if it is assumed that the data to be stored as File 5 is the one that should be stored in the first empty area list 68, and that the length is 3000, then the process proceeds from decision step 33 to decision step 34 where it is examined whether there is an empty area registered in the first empty area list 68. If the result shows that there is an empty area registered in the first empty area list 68, the process proceeds to process step 36.

In process step 36, the head address and end address of the empty area are acquired from the empty area information 63 at the head of the first empty area list 68, and in process step 38, the data to be stored is stored in sequence starting from the head address of the empty area. Since the empty area length of the empty area information 63 is 1000, as shown in FIG. 5, the empty area of the empty area information 63 is used up when the data is stored up to the length of 1000, and the storing operation is suspended with data of a length of 2000 remaining to be stored.

In process step 40 in FIG. 7, the head address and end address of the area where the data has been stored are registered as data area information 61 in the data area list 67. In process step 42, since the empty area of the empty area information 63 has all been used for data storage, the empty area information 63 is deleted from the first empty area list 68.

Next, in decision step 44, a decision is made as to whether there is data remaining to be stored. In the illustrated example, since there remains data of a length of 2000 yet to be stored, the process returns to decision step 34 to repeat the above-mentioned data storing operation. In process step 36, the head address (10000) and end address (100000) are acquired from the empty area information 64 in the first empty area list 68. In process step 38, the remaining data to be stored is stored in the area whose head address is 10000.

Figure 8:
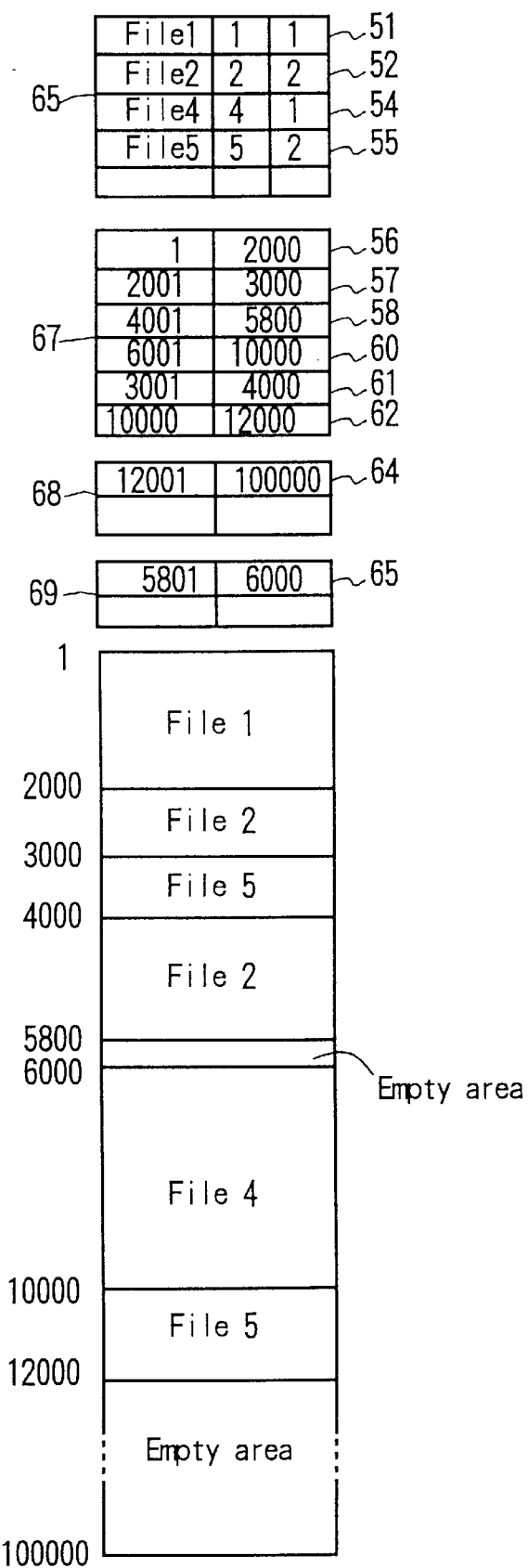
FIG. 8 is a schematic diagram showing a data storage allocation according to the first embodiment.

In process step 40, the head address 10000 and end address 12000 are registered as the data area information 62 in the data area list 67. Then, in process step 42, the head address of the empty area information 64 in the first empty area list 68 is changed to 12001. In decision step 44, a decision is made as to whether there is data remaining to be stored. In the illustrated example, since there is no data remaining to be stored, in process step 47 file information 55 (File 5) is registered in the file list 66, upon which the file storage process is terminated. The resulting data storage allocation is shown in FIG. 8.

As mentioned above, in the storage apparatus of the first embodiment, the length of an empty area is compared in area length comparing means with the minimum area length, and in accordance with the result of the comparison, the empty area is registered in the first empty area list or the second empty area list. The first embodiment thus provides the effect that empty areas of long area length and empty areas of short area length can be used selectively according to the speed required for data writing or reading.

Furthermore, in the storage apparatus of the first embodiment, the minimum storage area length is obtained as a minimum data amount for which the sum of the maximum value of the time required to access an empty area or storage area and the time required to write data to or read data from the storage area is equal to or smaller than the maximum processing time required to process the data. The first embodiment therefore provides the effect that optimum minimum area length can be set for different recording media having different access times and different read/write times.

Further, the maximum value of the time required to access a storage area and the time required to write data to or read data from the storage area are measured and stored in advance, with the effect that optimum minimum area length can be set automatically when the recording medium is replaced by a different recording medium having a different read/write time.

The first embodiment has been described by dealing with a case where an entire file is deleted or stored, but it will be appreciated that the deletion and storage operations can also be performed in like manner when deleting a portion of a file or adding a portion of a file to another existing file. Further, a head address and an end address are used to specify an area in the data area list, first empty area list, and second empty area list, but it will be noted that such areas can also be specified by a head address and area length.

Furthermore, the first embodiment has been described using a magnetic disk apparatus as an example, but it will be recognized that the configuration of the first embodiment is applicable to any storage apparatus that performs reading and writing with a read/write head moving relative to a recording medium.

In the first embodiment, it has been described that the data write or read speed is measured by writing or reading data of one sector, but the data amount is not limited to one sector but can be set to any suitable number of sectors.

Furthermore, when measuring the access time, instead of setting the origin at the position of the sector of logical block address 0, as mentioned above, the origin may be set at any other position as long as the position can be used to measure the maximum value of the access time.

Moreover, the first embodiment has been described as having a configuration where the disk characteristic list is stored in a nonvolatile memory, but instead, the disk characteristic list may be stored on a recording medium as long as it can be written and read out externally.

<<Embodiment 2>>

Next, a second embodiment of the storage apparatus of the present invention will be described with reference to the accompanying drawings. The storage apparatus of the second embodiment differs from the first embodiment only in the file deletion process, and the other processes are the same between them. Accordingly, the file deletion process will be described hereinafter.

Figure 9:
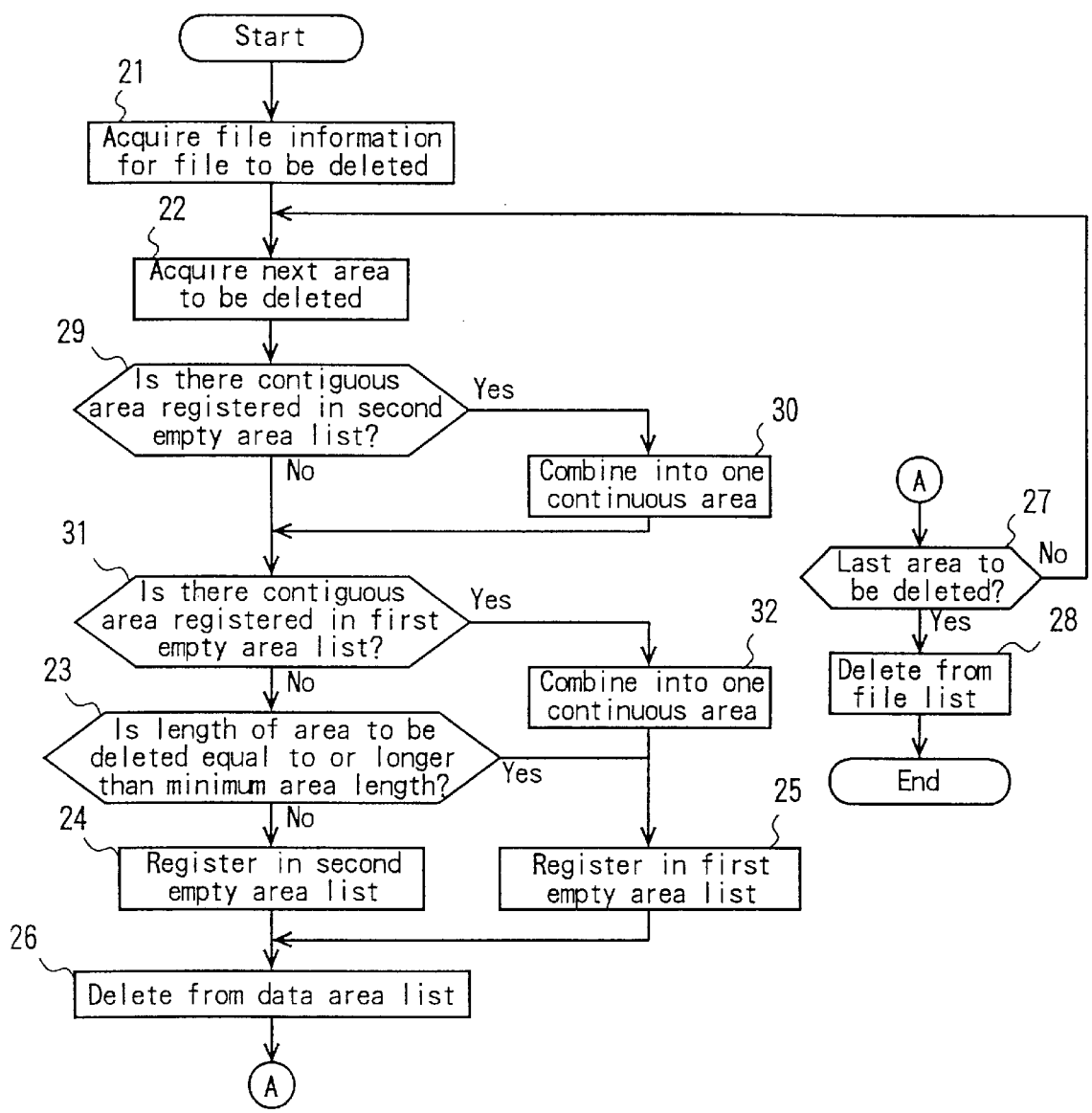
FIG. 9 is a flow chart illustrating a file deletion process flow according to a second embodiment of the present invention.
Figure 10:
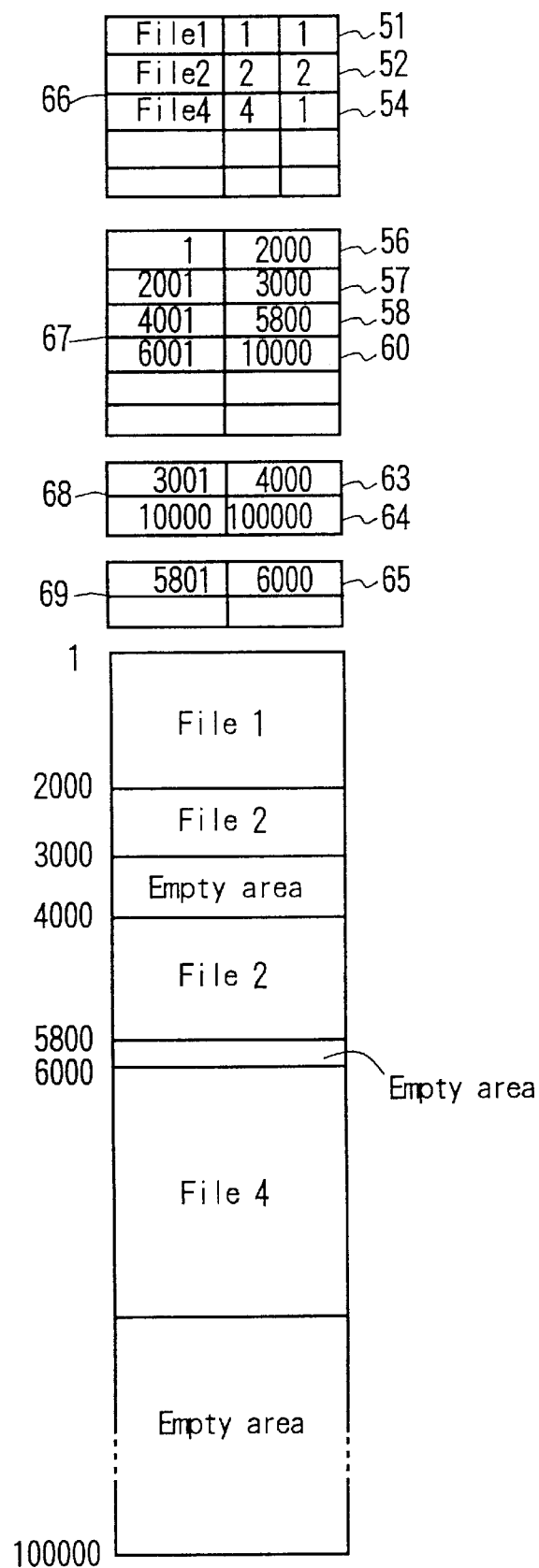
FIG. 10 is a schematic diagram showing a data storage allocation according to the second embodiment.
Figure 11:
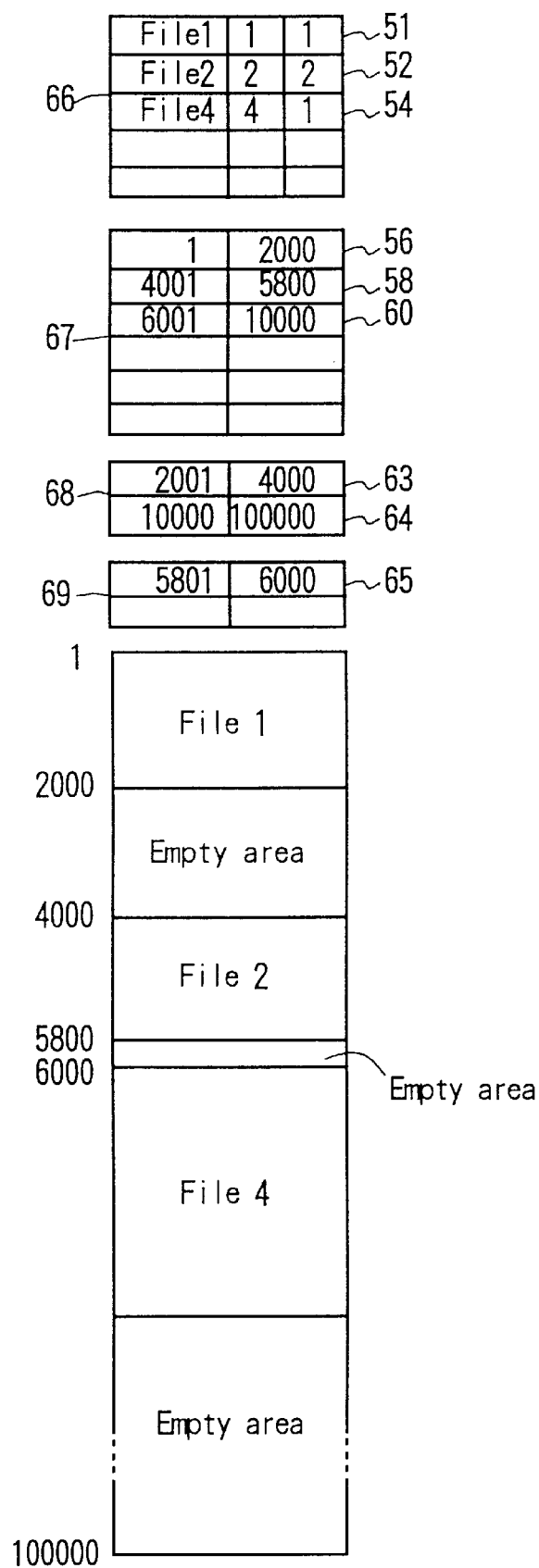
FIG. 11 is a schematic diagram showing a data storage allocation according to the second embodiment.
Figure 12:
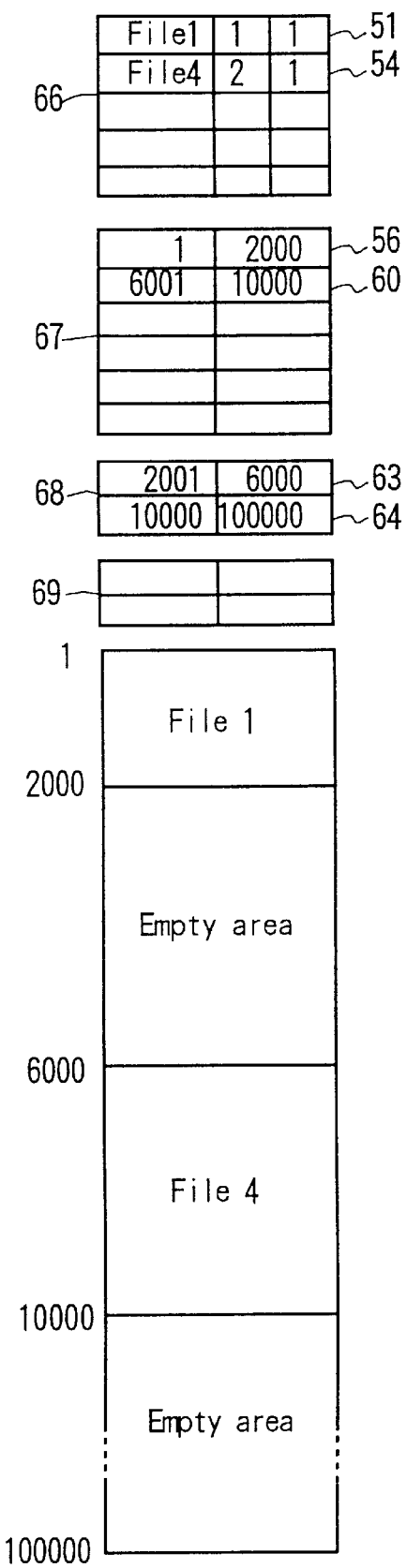
FIG. 12 is a schematic diagram showing a data storage allocation according to the second embodiment.

FIG. 9 is a flow chart illustrating the flow of the file deletion process according to the second embodiment of the present invention. FIGS. 10, 11, and 12 are schematic diagrams for explaining data storage allocations on the magnetic disk during the file deletion process.

In FIGS. 10, 11, and 12, the file list 66, the data area list 67, the first empty area list 68, and the second empty area list 69, as well as the information in each list, are the same as those used in the description of the first embodiment, and therefore, their descriptions will not be repeated here. In the second embodiment, as in the first embodiment, it is assumed that the minimum area length is 500.

With the data storage allocation on the magnetic disk as shown in FIG. 10, when a command is issued to delete File 2, the location of the starting area and the number of areas of File 2 are retrieved in process step 21 (FIG. 9) from the file information 52 for File 2 carried in the file list 66.

Since the location of the starting area of File 2 in the file list 66 is "2", as shown in FIG. 10, in process step 22 the head address and end address are acquired from the second data area information 57 in the data area list 67. The area defined by the head address and end address of this data area information 57 is designated as the area to be deleted.

In decision step 29 in FIG. 9, the thus acquired head address and end address of the area to be deleted are compared with the head address and end address of each empty area registered in the second empty area list 69, to determine whether an area contiguous to the area to be deleted is registered in the second empty area list 69. In the state shown in FIG. 10, the area to be deleted is from 2001 to 3000 of the data area information 57, whereas the empty area registered in the second empty area list 69 is from 5801 to 6000. Since, in the second empty area list 69, there are no areas contiguous to the area to be deleted, the process proceeds to decision step 31.

In decision step 31, an operation similar to that in the preceding decision step 29 is performed, to determine whether an area contiguous to the area to be deleted is registered in the first empty area list 68. Since an empty area from 3001 to 4000 is registered as empty area information 63 in the first empty area list 68, in process step 32 the empty area is combined with the area to be deleted, and the combined area 2001 to 4000 is now designated as the area to be deleted. Then, the empty area information 63 is deleted from the first empty area list 68. Since the new area to be deleted is created by combining with the empty area registered in the first empty area list 68, it is clear that its length is longer than the minimum area length 500. Accordingly, decision step 23 is skipped, and in process step 25, the new area to be deleted is registered as empty area information 63 in the first empty area list 68 by sorting the registered information by head address.

In process step 26, the data area information 57 is deleted from the data area list 67, and the resulting vacant space is filled by moving the data area information 58, 60 forward. At the end of this step, the data storage allocation on the magnetic disk is as shown in the schematic diagram of FIG. 11.

Next, in decision step 27, 1 is subtracted from the number of areas of File 2, and 1 remains, which indicates that there is an area remaining to be deleted. Accordingly, the process returns to process step 22 to repeat the above-mentioned deletion operation. Information on the next area to be deleted is retrieved from the second data area information 58 (head address: 4001, end address: 5800) in the data area list 67 shown in FIG. 11.

In decision step 29, the second empty area list 69 is checked to determine whether there is any empty area contiguous to the area to be deleted. Since the empty area (head address: 5801, end address: 6000) registered in the empty area information 65 is contiguous to the area to be deleted (head address: 4001, end address: 5800), in process step 30 the empty area is combined with the area to be deleted, and the combined area from 4001 to 6000 is now designated as the area to be deleted. Then, the empty area information 65 is deleted from the second empty area list 69. If there is any empty area information down the list after the empty area information 65, such empty area information is moved forward to fill the newly created vacant space; however, in the illustrated example, since there is no such empty area registered in the second empty area list 69, the operation to fill the vacant space is not performed.

Further, in decision step 31, the first empty area list 68 is checked to determine whether there is any empty area contiguous to the area to be deleted. In the illustrated example, since the empty area (head address: 2001, end address: 4000) registered in the empty area information 63 is contiguous to the area to be deleted (head address: 4001, end address: 6000), in process step 32 the empty area is combined with the area to be deleted, and the combined area from 2001 to 6000 is now designated as the area to be deleted. Then, the empty area information 63 is deleted from the first empty area list 68. Since the new area to be deleted is created by combining with the empty area registered in the first empty area list 68, it is clear that its length is longer than the minimum area length 500. Accordingly, decision step 23 is skipped, and in process step 25, the new area to be deleted is registered as empty area information 63 in the first empty area list 68.

In process step 26, the data area information 58 is deleted from the data area list 67, and the data area information 60 is moved forward to fill the vacant space.

In decision step 27, 1 is subtracted from the number of areas of File 2, and 0 remains, which indicates that there are no longer any areas remaining to be deleted. Accordingly, in process step 28, the file information 52 of File 2 is deleted, and the file information 54 is moved forward to fill the vacant space. The starting area location of File 4 is updated to match the updated data area list; the resulting data storage allocation is shown in FIG. 12.

The file storage process is the same in operation as that described in the foregoing first embodiment, and therefore, will not be described here.

As mentioned above, in the second embodiment, it is determined whether or not an area contiguous to an empty area is located within the empty areas registered in the first empty area list or the second empty area list. If an empty area contiguous to it is located, the empty area is combined with the empty area contiguous to it, to create a new continuous empty area, and the length of the new continuous empty area is compared with the minimum area length, in accordance with the result of which the empty area is registered in the first empty area list or the second empty area list. The storage apparatus of the second embodiment thus has the effect of achieving efficient utilization of empty areas, eliminating the possibility of contiguous areas being broken up into smaller pieces and managed as empty areas.

As in the first embodiment, the storage apparatus of the second embodiment also has been described by dealing with a case where an entire file is deleted or stored, but it will be appreciated that the same effect can be achieved when deleting a portion of a file or adding a portion of a file to another existing file. Further, in the second embodiment, a head address and an end address are used to specify an area in the data area list, first empty area list, and second empty area list, but it will be noted that such areas may be specified by a head address and area length. Furthermore, the second embodiment has been described using a magnetic disk as an example, but it will be recognized that the configuration of the second embodiment is applicable to any storage apparatus that performs reading and writing with a read/write head moving relative to a recording medium.

<<Embodiment 3>>

A third embodiment of the storage apparatus of the present invention will be described below with reference to relevant drawings.

FIG. 13 is a block diagram showing essential portions of a television receiver using the storage apparatus of the third embodiment.

In FIG. 13, an analog-digital video signal converter 101a converts an analog video signal, input from a tuner not shown or input via a video input terminal 190, into a digital video signal. An analog-digital audio signal converter 101b converts an analog audio signal, input from the tuner or input via an audio input terminal 191, into a digital audio signal. A video signal processing circuit 2 processes the digital video signal, while an audio signal processing circuit 103 processes the digital audio signal.

A digital-analog video signal converter 104a converts the digital video signal into an analog video signal, and a digital-analog audio signal converter 104b converts the digital audio signal into an analog audio signal. A video output circuit 105 generates and outputs a signal for displaying an image on a CRT 107. An audio output circuit 106 generates and outputs a signal for producing sound from a speaker 108. A record/playback circuit 109 is a circuit for recording the digital video and audio signals on a magnetic disk apparatus 110, and for reading the digital video and audio signals from the magnetic disk apparatus 110.

The operation of the thus configured television receiver according to the third embodiment will be described below.

The analog video signal input via the video input terminal 190 and the analog audio signal input via the audio input terminal 191 are converted by the analog-digital video signal converter 101a and the analog-digital audio signal converter 101b into a digital video signal and a digital audio signal, respectively, and the converted signals are respectively supplied to the video signal processing circuit 102 and the audio signal processing circuit 103.

The video signal processing circuit 102 first separates the digital video signal into a luminance signal and color-difference signals, and then switches the destination of the luminance signal and color-difference signals between the record/playback circuit 109 and the digital-analog video signal converter 104a. The video signal processing circuit 102 also has the function of directing the luminance signal and color-difference signals, supplied from the record/playback circuit 109, to the digital-analog video signal converter 104a.

The audio signal processing circuit 103 switches the destination of the digital audio signal between the record/playback circuit 109 and the digital-analog audio signal converter 104b. The audio signal processing circuit 103 also has the function of directing the audio signal, supplied from the record/playback circuit 109, to the digital-analog audio signal converter 104b.

The digital-analog video signal converter 104a converts the digital luminance signal and color-difference signals into analog signals, which are supplied to the video output circuit 105 to reproduce an image on the CRT 107. The digital-analog audio signal converter 104b converts the digital audio signal to an analog signal, which is supplied to the audio output circuit 106 to reproduce sound from the speaker 108.

The record/playback circuit 109 records the luminance signal and color-difference signals, supplied from the video signal processing circuit 102, and the audio signal, supplied from the audio signal processing circuit 103, as data onto the magnetic disk apparatus 110. The record/playback circuit 109 also has the function of reading the data recorded on the magnetic disk apparatus 110, and supplying the luminance signal and color-difference signals to the video signal processing circuit 102 and the audio signal to the audio signal processing circuit 103.

With the above-mentioned operation, a television receiver is realized that can record and play back video and audio on the magnetic disk apparatus 110.

Next, the operation of the magnetic disk apparatus 110 as the storage apparatus used with the television receiver according to the third embodiment of the present invention, will be described in detail with reference to FIGS. 14, 15, and 16.

FIG. 14 is a block diagram showing in schematic form the configuration of the storage apparatus according to the third embodiment. In FIG. 14, a command queue 111, using an area within a RAM, temporarily stores and holds a command supplied via an external command interface until the command is executed. A remaining time estimator 112 estimates a remaining time from the time required to execute the commands stored in the command queue 111 and a predetermined limit time. A defective area table 113 stores position data of nonusable areas by using an area within a nonvolatile RAM. A data buffer 114 is a temporary data storage area using a portion of a RAM, and allowing data transfer to and from an external data interface. A record/readout unit 115 transfers data to or from the data buffer 114 in accordance with the command from the command queue 111, and reads out or records data on the magnetic disk apparatus 110. An error processing method selection unit 116 selects an error processing method based on the remaining time estimated by the remaining time estimator 112 when an error occurs in the record/readout unit 115. An error processing unit 117 performs error processing in accordance with the method selected by the error processing method selection unit 116.

The external command interface and the external data interface are both connected to the record/playback circuit 109, and are used to receive commands from the record/playback circuit 109 and to input and output data.

FIG. 15 is a diagram showing a specific example of the structure of the command queue 111, wherein reference numerals 137, 138, and 139 indicate specific commands. As shown in FIG. 15, the command queue 111 consists of symbols "read" and "write" designating the operation to be performed, the logical block address of the first sector to be processed, and the number of sectors to be processed.

Figure 16:
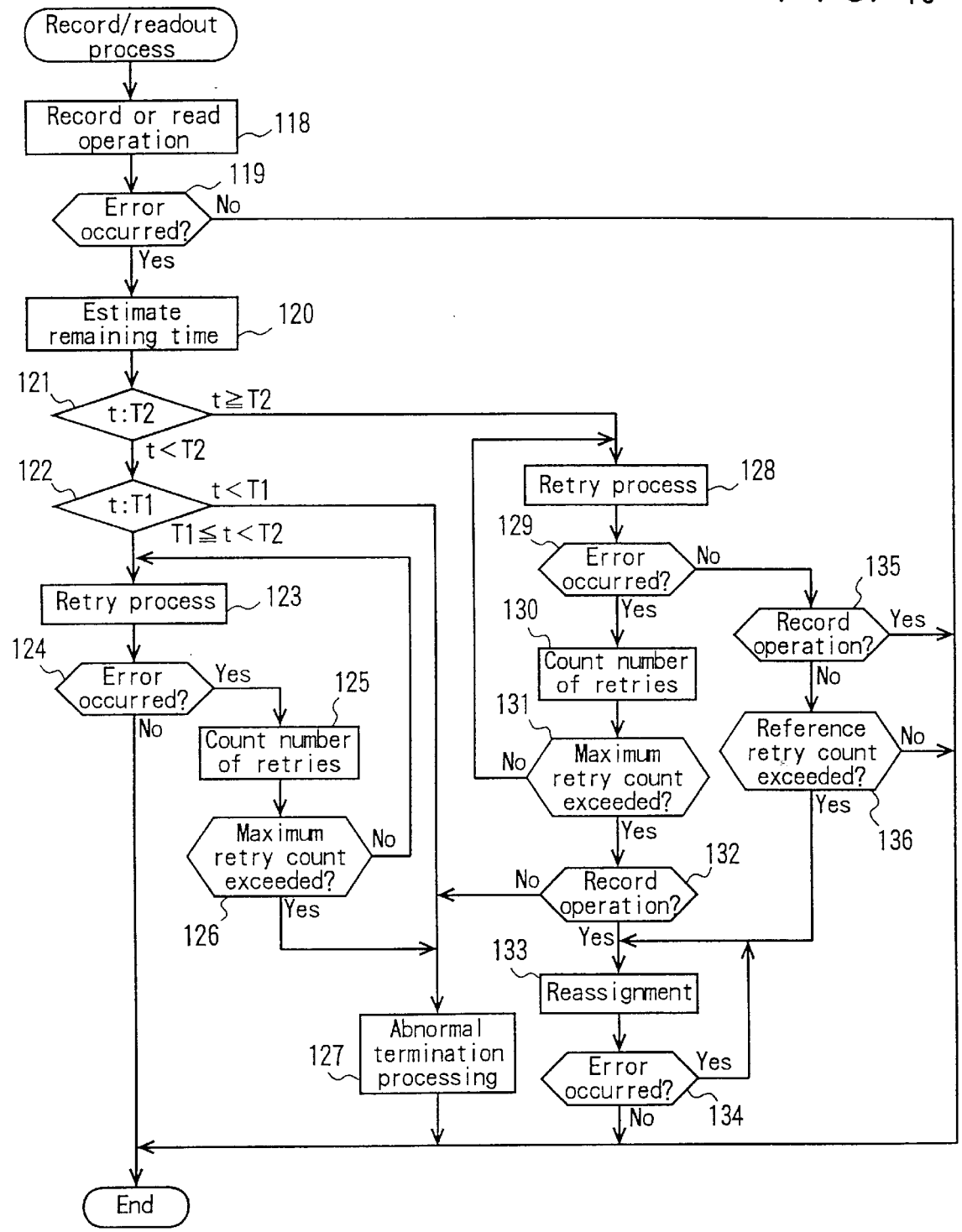
FIG. 16 is a flow chart illustrating a record/readout process flow according to the third embodiment.

FIG. 16 is a flow chart illustrating the flow of a record/readout process according to the third embodiment.

The retry process and reassignment process to be carried out in the flow chart shown in FIG. 16 will be described.

The retry process is a method of finding conditions that enable data recording or reading by repeating a record request or a read request while changing physical conditions. Assuming that the maximum number of retries is set to 10, for example, the first and second retry operations are performed using the same operating conditions as the initial conditions, then the third retry operation is performed by shifting the head inward from a reference position by an amount equal to 10% of track spacing. Further, the fourth retry operation is performed by shifting the head outward from the reference position by an amount equal to 10% of track spacing, the fifth retry operation is performed by shifting the head inward from the reference position by an amount equal to 15% of track spacing, and the sixth retry operation is performed by shifting the head outward from the reference position by an amount equal to 15% of track spacing. The seventh retry operation is performed by increasing bias current to the head by one step from a reference value, and the eighth retry operation is performed by reducing bias current to the head by one step from the reference value. The ninth and tenth retry operations are performed by moving the head back to the initial conditions. In this way, in the retry process in the third embodiment, record or read operations are performed by changing the head position and circuit parameters in accordance with a predetermined procedure for each retry operation.

The reassignment process will be described next.

A sector as a storage area unit of a magnetic disk is assigned two numbers: a logical block address which is a logical area number that an external control unit uses, and a physical address which is used within the magnetic disk apparatus 110, and which indicates the physical position on the magnetic disk by specifying a particular magnetic disk among the magnetic disks mounted, the side of the magnetic disk, the track number as counted from the outermost track, and the sector number within that track. In the magnetic disk apparatus 110, the logical block address specified by an external device is translated into a physical address by using a logical block address to physical address translation table contained in the magnetic disk apparatus 110, and based on the physical address, the head is moved to the sector where data is to be recorded or read out.

The reassignment process uses the above-mentioned head moving process, and translates the logical block address originally assigned to an error area into the physical address of a sector reserved for use as an alternate sector. With this reassignment process, an alteration is made to the translation table so that the logical block address is reassigned to an error-free sector. By performing the reassignment process in this way, the external control unit can access without having to be aware of the logical block address at which an error occurred.

The record/readout process will be described below with reference to FIG. 16, focusing particularly on the error processing selection operation.

When a command to record or read data on the magnetic disk is issued to the storage apparatus of the third embodiment, the contents of the command are temporarily stored in the command queue 111, as shown in FIG. 14. The record/readout unit 115 acquires the information of the command stored in the command queue 111, for example, the information of the command 137 (FIG. 15), to initiate the record or read operation.

In the record/readout process of FIG. 16, the record or read operation is performed in process step 118, and a decision is made in decision step 119 as to whether an error has occurred or not. If it is decided in decision step 119 that no error has occurred, the record/readout process is terminated.

If it is decided in decision step 119 that an error has occurred, error processing is initiated; first, in process step 120, the time required to execute the commands currently stored in the command queue 111, for example, the commands 137, 138, 139, and 140, is estimated, thereby computing the remaining time t during which reading or writing is not performed.

Here, an explanation will be given of the method of computing the remaining time t in process step 120 when the commands stored in the command queue 111 are executed.

The remaining time t is computed by the following equation (2). Here, the execution time of each command is approximated by the proportional expression of the amount of data to be recorded or read out. In equation (2), Li is the amount of record or readout data specified by each command stored in the command queue 111, V is the amount of signal recorded or read out in unit time by the record/readout unit 115, and T is the predetermined limit time:

$$t = T - (\Sigma Li)/V \qquad (2).$$

In this equation, $\Sigma$ indicates the summation of all the commands stored in the command queue 111. For example, consider the case where four commands, 137, 138, 139, and 140, are stored in the command queue 111. When the sector size is 512 bytes, the amount of signal, V, recorded or read out in unit time is 4,000,000 bytes/second, and the limit time T is 200 milliseconds, then the remaining time t is calculated as follows:

$$\begin{aligned} t &= 0.2 - (100 \times 512) \times 4/4{,}000{,}000 \qquad (3)\\ &= 0.2 - 0.0512 \text{ (sec.)}\\ &= 0.1488 \text{ (sec.)} \end{aligned}$$

Returning now to the flow chart of FIG. 16, the error processing in the record/readout process will be described.

In decision step 121, the remaining time t thus estimated is compared with the error processing time T2 required to carry out an error processing method that takes the longest processing time. If the remaining time t is shorter than the longest error processing time T2, then in decision step 121 the remaining time t is compared with the error processing time T1 required to carry out an error processing method that takes the second longest processing time. If the remaining time t is shorter than the second longest error processing time T1, it is then determined that there is not enough time left for error processing, and the process proceeds to process step 127 to notify the higher-level control unit that the record or read operation has not been completed normally, upon which the process flow is terminated. On the other hand, if the remaining time t is equal to or longer than the error processing time T1, the process proceeds to process step 123 where a record or readout retry operation is performed as error processing.

The result of the retry operation is checked in decision step 124, and if there are no errors, the process flow is terminated. If an error is detected in decision step 124, the number of retries is counted in process step 125; then, in decision step 126, it is determined whether or not the number of retries thus counted has exceeded a predetermined maximum retry count. If it is determined in decision step 126 that the present number of retries has yet to exceed the maximum retry count, the process returns to process step 123 to repeat the retry operation. On the other hand, if it is determined in decision step 126 that the present number of retries has exceeded the maximum retry count, then it is determined that the error recovery has failed, and the process proceeds to process step 127 to notify the higher-level control unit of an error occurrence, upon which the process flow is terminated.

On the other hand, if it is determined in decision step 121 that the remaining time t is equal to or longer than the error processing time T2, first in process step 128 a record or readout retry operation is performed as error processing. The result of the retry operation is checked in decision step 129. If an error is detected in decision step 129, the number of retries is counted in process step 130; then, in decision step 131, it is determined whether or not the number of retries thus counted has exceeded the predetermined maximum retry count.

If it is determined in decision step 131 that the present number of retries has yet to exceed the maximum retry count, the process returns to process step 128 to repeat the retry operation. On the other hand, if it is determined in decision step 131 that the present number of retries has exceeded the maximum retry count, then in step 132 it is determined whether the commanded operation is a record operation or a read operation. If the commanded operation is a read operation, it is determined that the reading is impossible, and the higher-level control unit is notified accordingly. If the commanded operation is a record operation, the process proceeds to process step 133 where a reassignment operation is performed to reassign the logical block address of the error sector to another sector.

In decision step 134, it is determined if there has occurred an error in the reassignment operation performed in process step 133; if an error is detected, process step 133 is repeated, but if no errors, the process flow is terminated.

If, in decision step 129, it is determined that there are no errors, then in decision step 135 it is determined whether the commanded operation is a record operation or a read operation. If it is determined in decision step 135 that the commanded operation is a record operation, the process flow is terminated. On the other hand, if the commanded operation is a read operation, then in decision step 136 it is determined whether or not the number of retries has exceeded a predetermined reference retry count. If the present number of retries has yet to exceed the reference retry count, the process flow is terminated without further processing. If the present number of retries has exceeded the reference retry count, a reassignment operation is performed in process step 133 to prevent the data from becoming unretrievable in case the sector is rendered unreadable in future. The process flow after this reassignment operation is the same as that of the record operation earlier mentioned.

An explanation will now be given of the values of the error processing times T1 and T2 used in the decision steps 121 and 122 in the error processing flow shown in FIG. 16.

The conditions used in the error processing are as follows: the time required for one retry of a command is 10 milliseconds, the time required for the reassignment operation is 50 milliseconds, and the maximum number of retries before the retry operation is aborted is set to 10.

The error processing time T1 serves as a criterion for determining whether only a retry operation is to be performed as error processing or nothing is to be performed. Accordingly, the error processing time T1 is the time required to repeat the retry operation the maximum number of times, and is given as follows:

$$T1 = (\text{Retry time}) \times 10 \quad (4)$$
$$= 10 \text{ msec.} \times 10$$
$$= 100 \text{ msec.}$$

The error processing time T2 serves as a criterion for determining whether a retry operation and a reassignment operation are to be performed as error processing. The error processing time T2 required to perform the retry operation and reassignment operation is given as follows:

$$T2 = (\text{Retry time}) \times 10 + (\text{Reassignment execution time}) \quad (5)$$
$$= 10 \text{ msec.} \times 10 + 50 \text{ msec.}$$
$$= 150 \text{ msec.}$$

In the case previously shown in FIG. 15 where the four commands 137, 138, 139, and 140 are stored in the command queue, the remaining time t was calculated as 148.8 milliseconds as shown in equation (3). In this case, therefore, an error processing method that performs only a retry operation is selected.

In this way, by selecting the appropriate error processing method according to the remaining time t representing the difference between the time required to execute the commands and the limit time, the time required for error processing in the event of an error occurrence can be limited, thus reducing the delay caused in the record/readout process by the error processing.

The third embodiment has been described by taking an example in which the retry operation and reassignment operation are used as the error processing methods and three choices, "no error processing", "retry operation only", and "retry operation and reassignment operation", are presented for selection. The present invention, however, is not limited to the error processing methods and the number of choices shown in the third embodiment, but it will be appreciated that the same effect as achieved by the third embodiment can be obtained as long as provisions are made to select an appropriate error processing method according to the remaining time t.

In the third embodiment, the command queue has been described as having the structure consisting of the command operation, the logical block address of the first sector, and the number of sectors, but the command queue in the storage apparatus of the present invention is not limited to the structure illustrated in the third embodiment; rather, the command queue can be configured in any suitable structure as long as it represents the contents of processing.

Further, in the present invention, the calculation method for the remaining time t is not limited to the equation used in the description of the third embodiment, but any other method that can estimate the difference between the limit time and the command execution time may be used.

In the third embodiment, the defective area table has been implemented using a portion of a nonvolatile RAM, but instead, the defective area table may be recorded on a disk, for example; that is, any storage device that can retain data when power is cut off may be used.

Furthermore, the third embodiment has been described using a magnetic disk apparatus as an example of the storage apparatus, but the present invention is applicable for any storage apparatus capable of random accessing, including, for example, a magneto-optical disk storage apparatus.

<<Embodiment 4>>

Next, a fourth embodiment of the storage apparatus of the present invention will be described with reference to the accompanying drawings.

Figure 17:
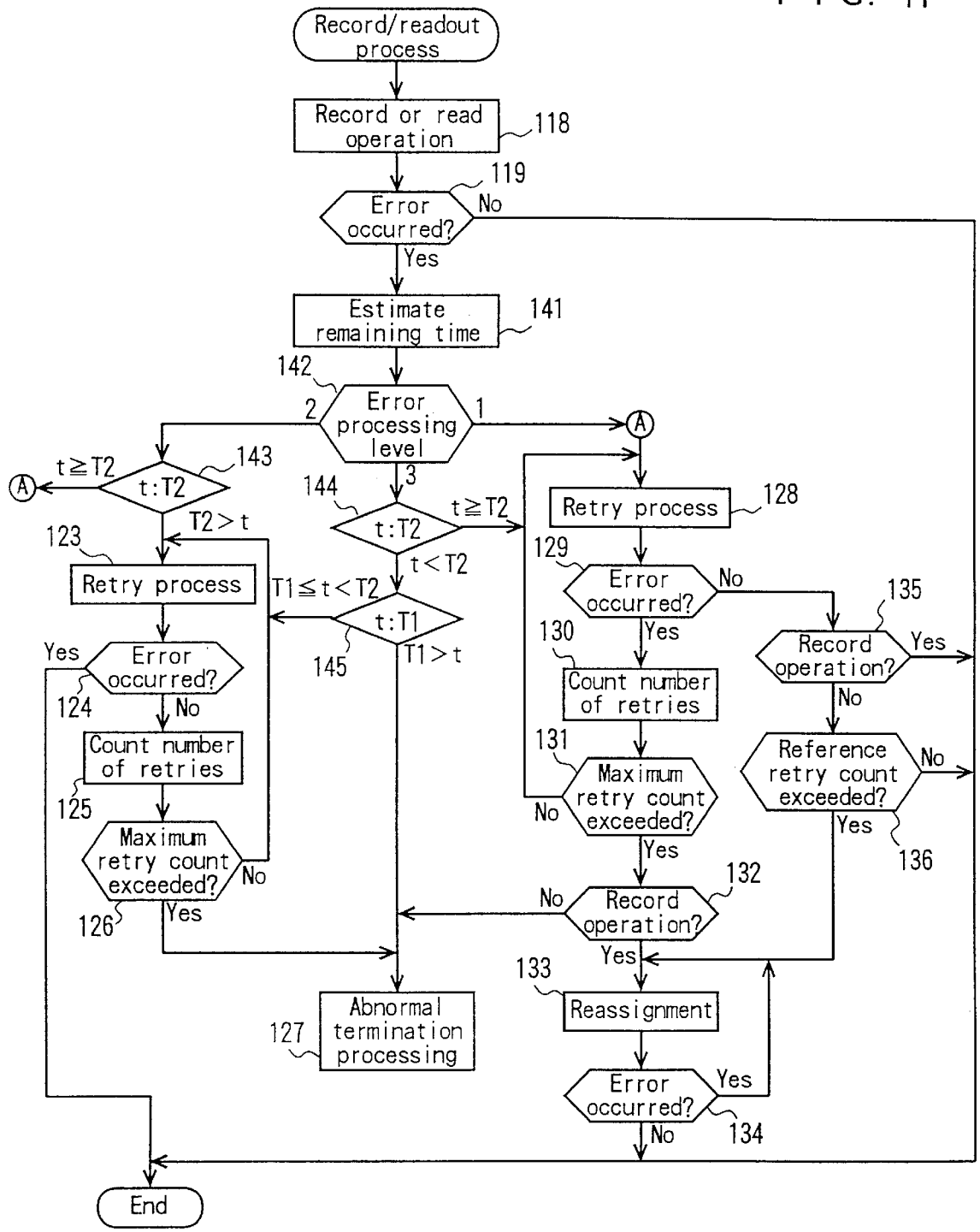
FIG. 17 is a flow chart illustrating a record/readout process flow according to a fourth embodiment of the present invention.

FIG. 17 is a flow chart illustrating an error processing flow in a record/readout process according to the storage apparatus of the fourth embodiment. FIG. 18 is a diagram showing an example of a command queue structure according to the fourth embodiment.

In the command queue structure shown in FIG. 18, commands 146, 147, 148, and 149 are specific examples of commands, each command consisting of a symbol designating a "read" or "write" operation, the logical block address of the first sector to be processed, the number of sectors to be processed, and an error processing level.

In the flow chart of FIG. 17, as in the foregoing third embodiment, when a command to record or read data is issued to the storage apparatus of the fourth embodiment, the record/readout process is invoked, and in process step 118, the data record or read operation is performed. In decision step 119, it is determined whether or not an error has occurred, and if no errors, the record/readout process is terminated. On the other hand, if there is an error, error processing is initiated; first, in process step 141, the time required to execute the commands currently stored in the command queue 111, for example, the commands 146, 147, 148, and 149, is estimated, thereby computing the remaining time t during which reading or writing is not performed.

Here, an explanation will be given of the method of estimating the remaining time t in process step 141 when the commands stored in the command queue 111 are executed.

When Li is the amount of record or readout data specified by each command stored in the command queue 111, V is the amount of signal recorded or read out in unit time by the record/readout unit 115, Tmi is the time required for the head to move between the areas to be recorded or read by the commands, and T is the predetermined limit time, then the remaining time t is computed by the following equation (6):

$$t = T - (\Sigma Li)/V - \Sigma Tmi \qquad (6).$$

In equation (6), $\Sigma$ indicates the summation of all the commands stored in the command queue 111. For example, consider the case where four commands, 146, 147, 148, and 149, are stored in the command queue 111. When the sector size is 512 bytes, the amount of signal, V, recorded or read out in unit time is 4,000,000 bytes/second, the head moving time Tmi is 15 milliseconds regardless of the area position, and the limit time T is 200 milliseconds, then the remaining time t is calculated as follows:

$$\begin{aligned} t &= 0.2 - (100 \times 512) \times 4/4{,}000{,}000 - 0.015 \times 4 \\ &= 0.2 - 0.0512 - 0.06 \\ &= 0.0888 \text{ (sec.)} \end{aligned} \qquad (7)$$

Returning now to the flow chart of FIG. 17, the error processing in the record/readout process will be described.

In decision step 142, the error processing subsequently performed is selected based on the value of the error processing level assigned to the issued command.

If the error processing level of the command is 1, the retry operation and reassignment operation from process step 128 through decision step 136 are carried out. The processing of the retry operation and reassignment operation from process step 128 through decision step 136 is the same as the processing from process step 128 through decision step 136 shown in FIG. 16 in the foregoing third embodiment, and the description thereof will not be repeated here.

If the error processing level of the command is 2, then in decision step 143 the estimated remaining time t is compared with the time T2 required to carry out an error processing method that takes the longest time for error processing. If the remaining time t is equal to or longer than the error processing time T2, the retry operation and reassignment operation from process step 128 through decision step 136 are carried out. On the other hand, if the remaining time t is shorter than the error processing time T2, only the retry operation from process step 123 through decision step 127 is carried out. The processing of the retry operation from process step 123 through decision step 127 is the same as the corresponding processing in the foregoing third embodiment, and the description thereof will not be repeated here.

If the error processing level of the command is 3, then in decision step 144 the estimated remaining time t is compared with the time T2 required to carry out an error processing method that takes the longest processing time. If the remaining time t is equal to or longer than the error processing time T2, the retry operation and reassignment operation from process step 128 through decision step 136 are carried out. On the other hand, if the remaining time t is shorter than the error processing time T2, then in decision step 145 the estimated remaining time t is compared with the time T1 required to carry out an error processing method that takes the second longest processing time. If the remaining time t is shorter than the time T1, the process proceeds to process step 127 to notify the higher-level control unit that the record or read operation has not been completed normally, upon which the process flow is terminated.

If, in step 145, the remaining time t is equal to or longer than the error processing time T1, only the retry operation from process step 123 through decision step 127 is carried out.

As mentioned above, a necessary error processing level is preassigned to each command, and if there is not enough remaining time t available for error processing, error processing corresponding to the preassigned error processing level is carried out. If there is enough remaining time t, error processing that requires a longer processing time is carried out; in this way, the performance and processing speed requirements which differ depending on data attributes can be addressed appropriately. Moreover, when there is enough time available for error processing, it is possible to dynamically switch to a higher error processing level that takes a longer processing time but can provide higher reliability than the preassigned error processing level.

In this way, according to the error recovery processing method in the fourth embodiment, a plurality of error processing methods are provided from among which, by considering the operation prespecified for each record request or read request, all or part of the plurality of error processing methods are selected and carried out according to the estimated remaining time; this assures minimum reliability required of the data to be recorded or read out, and contributes to further enhancing reliability within a range that does not cause a delay in the processing of the record or read request.

<<Embodiment 5>>

Next, a fifth embodiment of the storage apparatus of the present invention will be described with reference to FIGS. 19 to 22.

Figure 19:
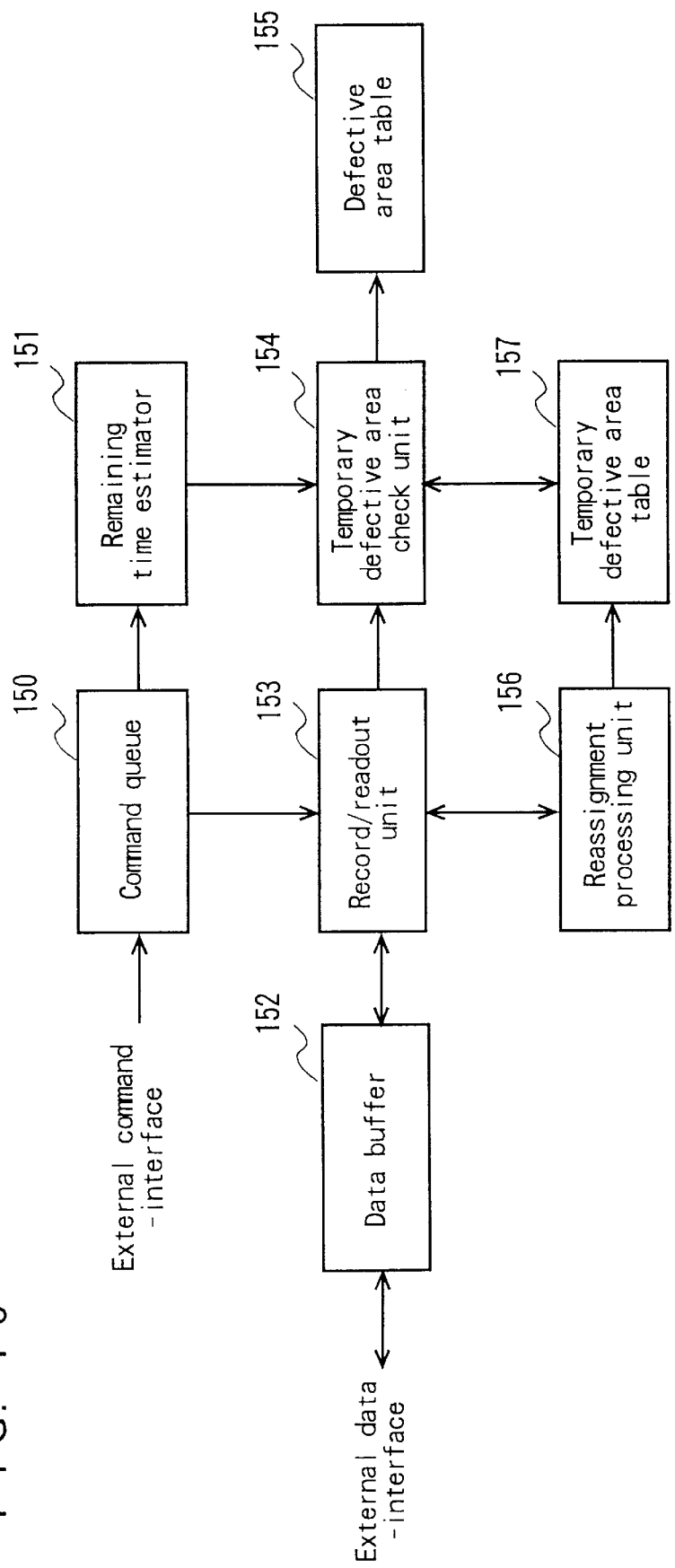
FIG. 19 is a block diagram showing in schematic form the configuration of a storage apparatus according to a fifth embodiment of the present invention.

FIG. 19 is a block diagram showing in schematic form the configuration of the storage apparatus according to the fifth embodiment in which an error recovery processing method is used.

In FIG. 19, a command queue 150 temporarily stores a command supplied via an external command interface. A remaining time estimator 151 estimates a remaining time from the time required to execute the commands stored in the command queue 150 and a predetermined limit time. A data buffer 152 has the function of temporarily storing data in order to allow data transfer to and from an external data interface. A record/readout unit 153 reads or records data on a recording medium in accordance with the command from the command queue 150. A defective area table 155 stores position data of nonusable areas.

A temporary defective area table 157 temporarily stores data associated with an area where an error has occurred during recording or reading. A reassignment processing unit 156, when an error has occurred in the record/readout unit 153, transfers data recorded or to be recorded in the error area to another area for recording therein, and registers the error area in the temporary defective area table 157. A temporary defective area check unit 154 carries out a check, if the remaining time estimated by the remaining time estimator 151 provides enough time to check whether the area registered in the temporary defective area table 157 is a nonusable area or not. If it is determined by the temporary defective area check unit 154 that the area is a nonusable area, then the data associated with that area is recorded in the defective area table 155; if it is determined that the area is usable, the data associated with that area is deleted from the temporary defective area table 157.

The operation of the storage apparatus shown in FIG. 19 will be described below.

The command stored in the command queue 150 is read out by the record/readout unit 153, and if the command thus read out is a record command, the data held in the data buffer 152 is recorded on the disk. On the other hand, if the command stored in the command queue 150 is a read command, data is read out from the disk and stored in the data buffer 152. If an error has occurred during recording or reading, the record/readout unit 153 immediately activates the reassignment processing unit 156 to initiate reassignment processing.

The reassignment processing unit 156 records data associated with the error sector in the temporary defective area table 157, performs a reassignment operation to allow data to be recorded on an alternate sector, and then instructs the record/readout unit 153 to continue the processing of the command. When the processing of the command is completed, the record/readout unit 153 activates the temporary defective area check unit 154. The temporary defective area check unit 154 acquires the remaining time estimated by the remaining time estimator 151, and determines whether the remaining time provides enough time to perform a temporary defective area check. After this determination, the sector registered in the temporary defective area table 157 is checked to determine whether it is a nonusable sector or not. If the sector is nonusable, then the sector is registered in the defective area table 155. On the other hand, if the sector registered in the temporary defective area table 157 is usable, the sector data reassigned to the alternate area is copied to the sector that has been judged to be usable, and the logical block address is reassigned once again.

FIG. 20 is a diagram showing an example of the structure of the temporary defective area table 157. In FIG. 20, data 161 is an example showing an area where an error has occurred, and consists of the logical block address already assigned at the time of error occurrence and the physical address designating its physical position on the disk. In the fifth embodiment, the structure of the temporary defective area table 157 is described as consisting of the logical block address and physical address, but it will be noted that the present invention is not limited to these specific addresses. Rather, in the present invention, any structure may be employed as long as it contains data that can identify the position of the area and data that can identify the logical position applicable before the reassignment, and the present invention is, under any circumstances, not limited to the structure of the fifth embodiment.

Figure 21:
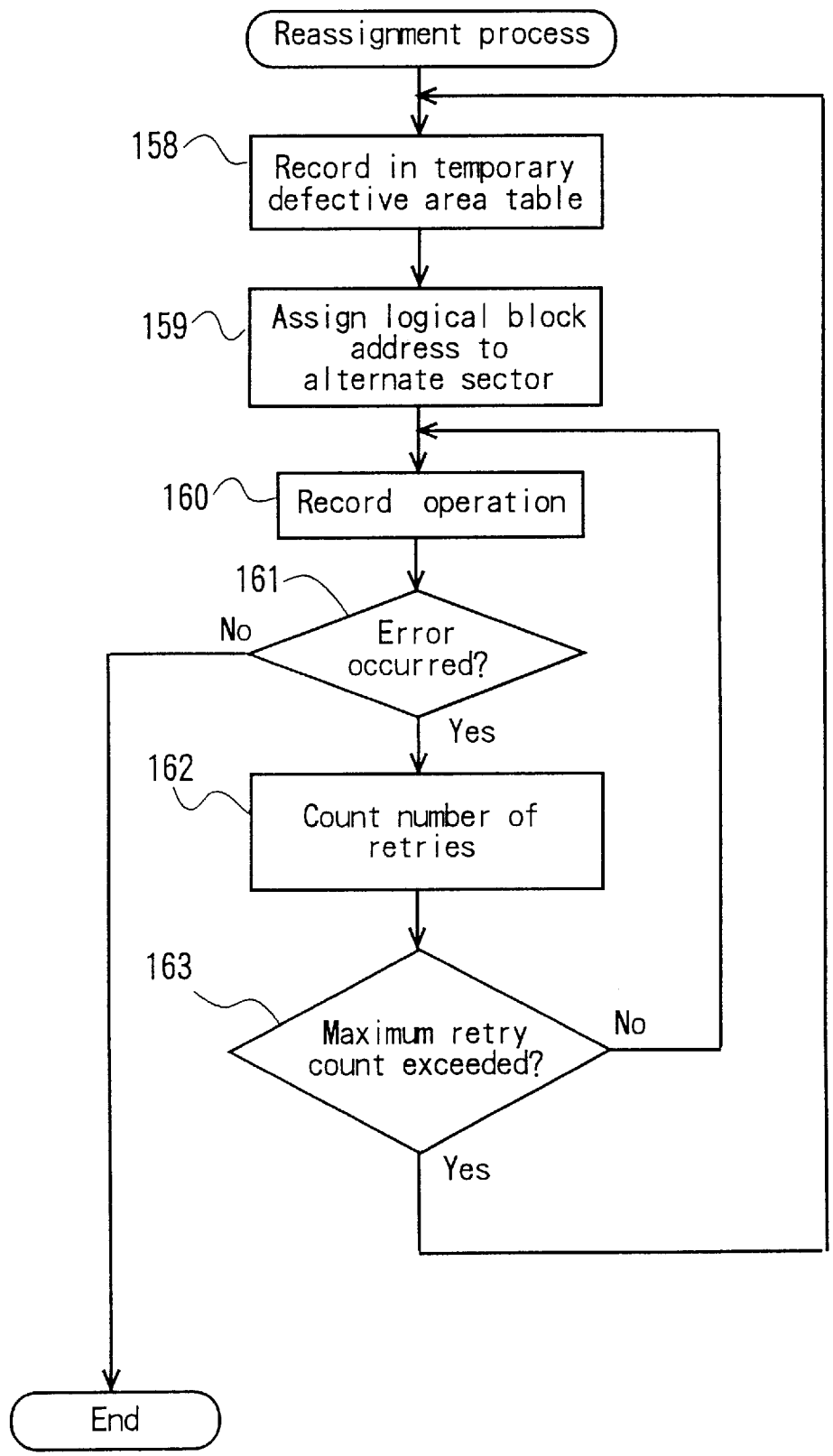
FIG. 21 is a flow chart illustrating a reassignment process flow according to the fifth embodiment.

FIG. 21 is a flow chart illustrating the reassignment process flow used in the error recovery processing method according to the fifth embodiment. The reassignment process flow in the fifth embodiment will be described below with reference to FIG. 21.

When an error occurs in the record/readout unit 153 (FIG. 19), the reassignment process is invoked, and in process step 158, the logical block address and physical address of the sector where the error is detected are recorded in the temporary defective area table 157. After the logical block address and physical address have been recorded in the temporary defective area table 157, in process step 159 the logical block address originally assigned to the error sector is reassigned to an unused alternate sector previously reserved as an area for reassignment.

In process step 160, data is recorded on the alternate sector with the new logical block address.

In decision step 161, it is determined whether an error has occurred in the recording on the alternate sector; if no errors, the reassignment process is terminated. If an error is detected, then the number of retries for recording is counted in process step 162. Next, if, in decision step 163, the present number of retries is smaller than a predetermined maximum retry count, the recording operation is carried out once again. If the present number of retries has exceeded the maximum retry count, the process returns to process step 158, and reassignment is carried out to another alternate sector.

Figure 22:
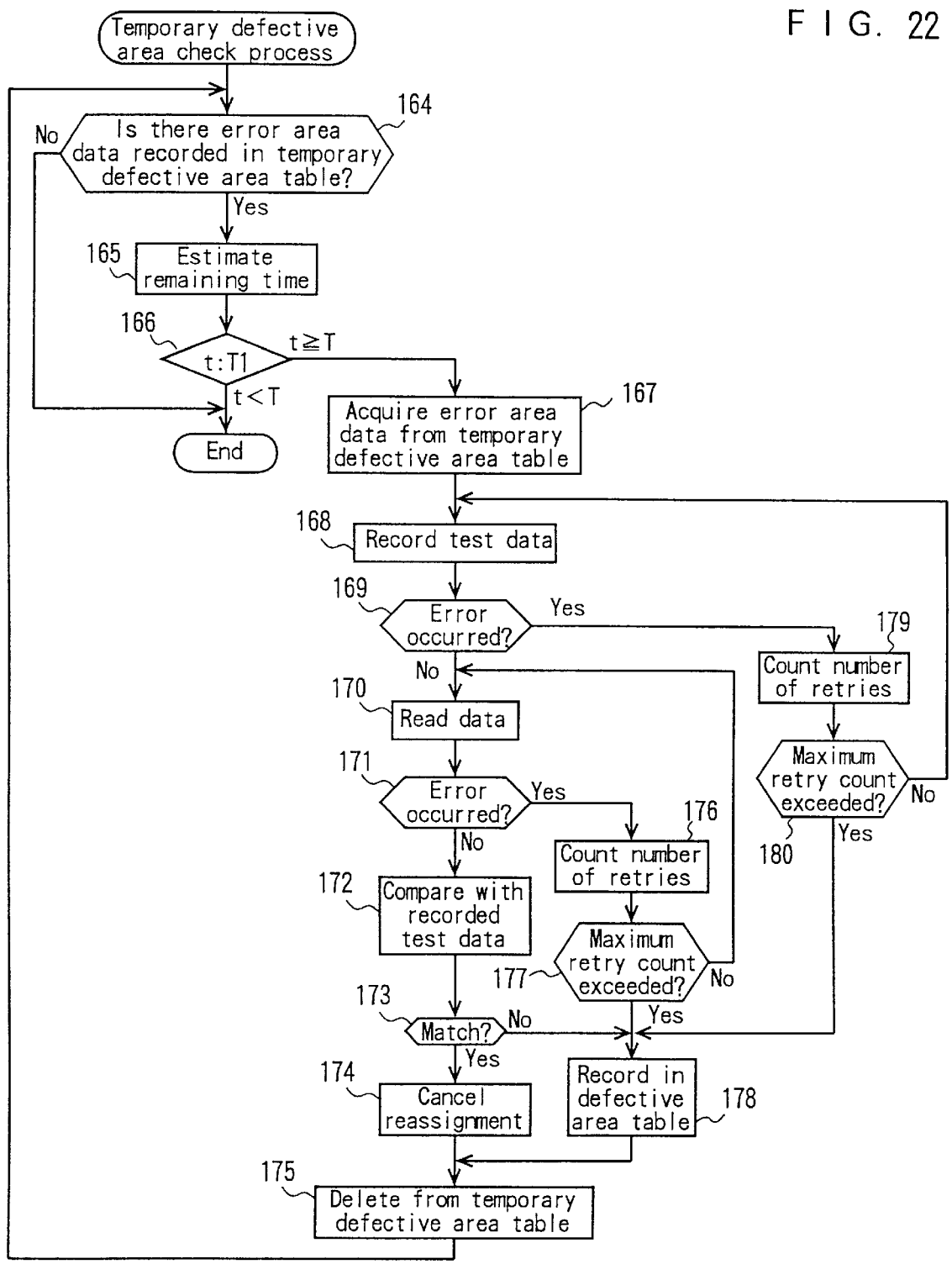
FIG. 22 is a flow chart illustrating a temporary defective area check process flow according to the fifth embodiment.
Figure 23:
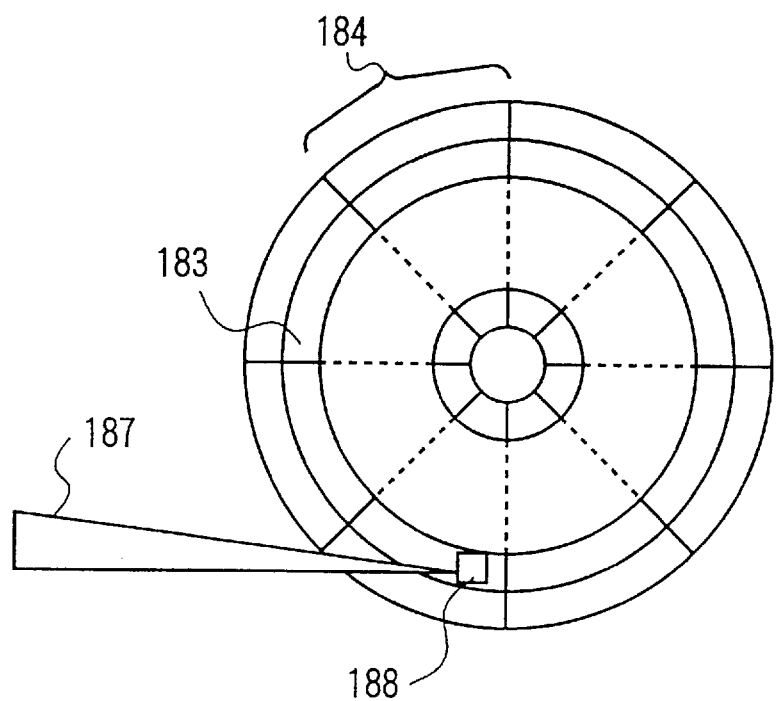
FIG. 23 is the diagram for explaining the configuration of the magnetic disk in the conventional magnetic disk apparatus.
Figure 24:
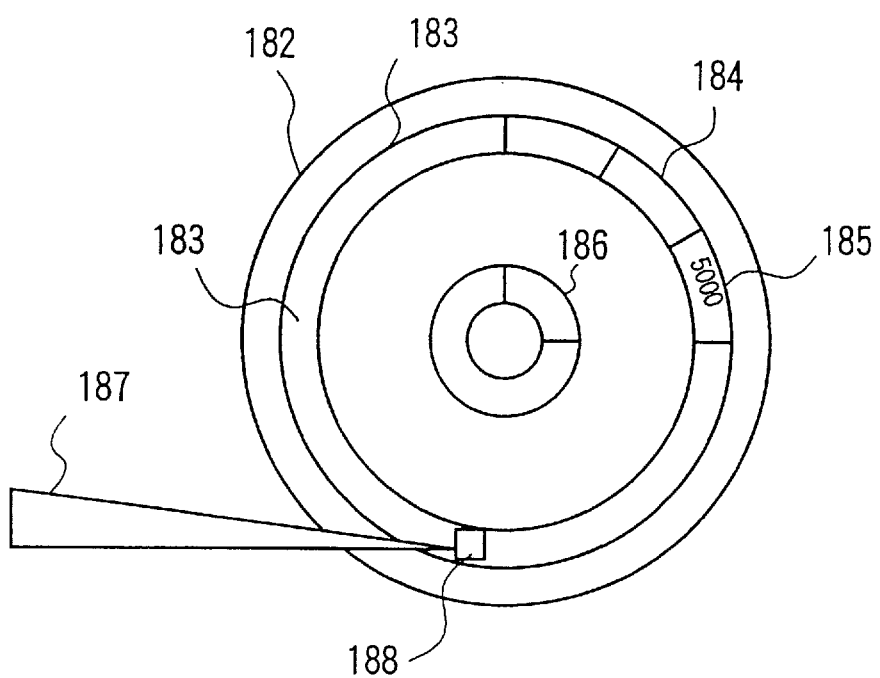
FIG. 24 is the diagram for explaining the configuration of the magnetic disk in the conventional magnetic disk apparatus.

Next, the flow of the temporary defective area check process in the fifth embodiment will be described in detail with reference to FIG. 22. FIG. 22 is a flow chart illustrating the flow of the temporary defective area check process used in the error recovery processing method according to the fifth embodiment.

When the temporary defective area check process is invoked, the temporary defective area table 157 (FIG. 19) is checked in decision step 164 to see whether the data associated with the area where the error is detected is recorded or not. If the data associated with the error area is not recorded in the temporary defective area table 157, the temporary defective area check process is terminated. On the other hand, if the data associated with the error area is recorded in the temporary defective area table 157, then in process step 165 the time required to process the commands stored in the command queue 150 is estimated, based on which the remaining time t during which recording or reading is not performed is computed.

In decision step 166, the thus computed remaining time t is compared with the time T required for checking. If the remaining time t is shorter than the check time T, it is determined that there is not enough time to carry out the temporary defective area check process, and the temporary defective area check process is terminated. If the remaining time t is equal to or longer than the check time T, then in process step 167 the data associated with the error area, for example, the data 161 shown in FIG. 20, is acquired from the temporary defective area table 157.

In process step 168, test data is recorded in the error area acquired from the temporary defective area table 157, for example, at physical address 010040021. In decision step 169, it is checked whether an error has occurred in the test data. If no error is detected in the test data, the recorded data is read out in process step 170. After confirming in decision step 171 that no error has occurred in reading, the recorded test data is compared in process step 172 with the readout test data.

In decision step 173, it is determined whether the recorded test data matches the readout test data. If they match, the reassignment is cancelled in process step 174, and the data that has been recorded on an alternate sector assigned the logical block address 5000, for example, is copied to the physical address 010040021. Then, after assigning the logical block address 5000 to the physical address 010040021, the data recorded on the alternate sector is deleted from the temporary defective area table 157 in process step 175, and the process returns to decision step 164.

If, in decision step 173, the recorded test data does not match the readout test data, the data associated with the error area is recorded in the defective area table 155 in process step 178, and the process proceeds to process step 175.

If, in decision step 169, an error is detected in the test data, the number of retries is counted in process step 179. In decision step 180, it is determined whether or not the present count has exceeded the predetermined maximum retry count. If the present count has yet to exceed the maximum retry count, the process returns to process step 168 to perform test data recording. If the present count has exceeded the maximum retry count, then in process step 178 the data associated with the error area is recorded in the defective area table 155.

If, in decision step 171, an error is detected in reading, the number of retries is counted in process step 176. In decision step 177, it is determined whether or not the predetermined maximum retry count is exceeded; if not exceeded, the process returns to process step 170 to read the test data. If it is determined in decision step 177 that the present count has exceeded the maximum retry count, then in process step 178 the data associated with the error area is recorded in the defective area table 155.

In this way, according to the error recovery processing method in the fifth embodiment, an area where an error has occurred is temporarily registered as a defective area in the temporary defective area table for reassignment processing, thus allowing the record/readout process to continue. This serves to reduce the error processing time while maintaining reliability.

Furthermore, according to the error recovery processing method in the fifth embodiment, the area registered in the temporary defective area table is checked to determine whether the area has failed in recording or reading for some reason related to the area itself or because of a temporary factor such as a displacement in head position or timing when recording or reading was performed. This serves to prevent defective areas from increasing in number because of such temporary factors.

Further, according to the error recovery processing method in the fifth embodiment, the time required to process the commands stored in the command queue is estimated, and when the remaining time t computed based on the estimated processing time is longer than the time required for checking, a check is performed on the area registered in the temporary defective area table. Accordingly, the storage apparatus equipped with the error recovery processing method of the fifth embodiment has an error processing function capable of reducing the delay caused in the record/readout process by the checking operation, thereby allowing realtime operation.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above-mentioned disclosure. Accordingly, it is intended that the appended claims be interpreted as covering all alterations and modifications as fall within the true spirit and scope of the invention.

We claim:

1. A recording area management method for managing a file list which is used to identify a file consisting of a series of data clusters, a data area list which is a list of position information of a plurality of areas holding said data clusters constituting said file, a first empty area list which is a list of position information of empty areas where no data are stored, and a second empty area list which is a list of position information of empty areas not included in said first empty area list, said recording area management method comprising:

an area length comparing step in which the length of an empty area in said first empty area list or said second empty area list is compared with a predetermined minimum area length; and a registration step in which said empty area is registered in said first empty area list or said second empty area list in accordance with the result of comparing the length of said empty area with said minimum area length in said area length comparing step.

2. A recording area management method according to claim 1, wherein when a recording area as an empty area or an area constituting a file satisfies the relation that the sum of a maximum value of the time required to access said recording area and the time required to record data on or read data from said recording area is equal to or less than a maximum processing time required to process said data, the area length of said recording area is determined as said minimum area length.

3. A recording area management method for managing a file list which is used to identify a file consisting of a series of data clusters, a data area list which is a list of position information of a plurality of areas holding said data clusters constituting said file, a first empty area list which is a list of position information of empty areas where no data are stored, and a second empty area list which is a list of position information of empty areas not included in said first empty area list, said recording area management method comprising:

an adjacent area judging step in which it is judged whether or not an area adjacent to an empty area exists among the empty areas registered in said first empty area list or said second empty area list;

a deleting step in which, if an area adjacent to said empty area is registered in said first empty area list or said second empty area list, said empty area and said adjacent empty area are combined to create a new continuous empty area, and information concerning said adjacent area is deleted from said first empty area list or said second empty area list;

an area length comparing step in which the length of said empty area is compared with a predetermined minimum area length; and a registration step in which said new continuous empty area is registered in said first empty area list or said second empty area list in accordance with the result of comparing the length of said new continuous empty area with said minimum area length in said area length comparing step.

4. A recording area management method according to claim 3, wherein when a recording area as an empty area or an area constituting a file satisfies the relation that the sum of a maximum value of the time required to access said recording area and the time required to record data on or read data from said recording area is equal to or less than a maximum processing time required to process said data, the area length of said recording area is determined as said minimum area length.

5. A storage apparatus comprising:

storage means for storing management information comprising a file list which is used to identify a file consisting of a series of data clusters, a data area list which is a list of position information of a plurality of areas holding said data clusters constituting said file, a first empty area list which is a list of position information of empty areas where no data are stored, and a second empty area list which is a list of position information of empty areas not included in said first empty area list;

area length comparing means for comparing the length of an empty area in said first empty area list or said second empty area list with a predetermined minimum area length; and registration means for registering said empty area in said first empty area list or said second empty area list in accordance with the result of the comparison performed in said area length comparing means.

6. A storage apparatus according to claim 5, wherein when a recording area as an empty area or an area constituting a file satisfies the relation that the sum of a maximum value of the time required to access said recording area and the time required to record data on or read data from said recording area is equal to or less than a maximum processing time required to process said data, the area length of said recording area is determined as said minimum area length.

7. A storage apparatus according to claim 6, comprising:

measuring means for measuring the maximum value of the time required to access said recording area as an empty area or an area constituting a file, and the time required to record data on or read data from said recording area; and storage means for storing said measured maximum value of the time required to access said recording area, and said measured time required to record data on or read data from said recording area.

8. A storage apparatus comprising:

storage means for storing management information comprising a file list which is used to identify a file consisting of a series of data clusters, a data area list which is a list of position information of a plurality of areas holding said data clusters constituting said file, a first empty area list which is a list of position information of empty areas where no data are stored, and a second empty area list which is a list of position information of empty areas not included in said first empty area list;

area length comparing means for comparing the length of an empty area in said first empty area list or said second empty area list with a predetermined minimum area length;

adjacent area judging means for judging whether an area adjacent to an empty area exists among the empty areas registered in said first empty area list or said second empty area list; and registration means for, when it is judged by said adjacent area judging means that an adjacent empty area exists, combining said empty area with said adjacent empty area to create a new continuous empty area, deleting information concerning said adjacent empty area from said first empty area list or said second empty area list, and registering said new continuous empty area in said first empty area list or said second empty area list in accordance with the result of comparing the length of said new continuous empty area with said minimum area length in said area length comparing means.

9. A storage apparatus according to claim 8, wherein when a recording area as an empty area or an area constituting a file satisfies the relation that the sum of a maximum value of the time required to access said recording area and the time required to record data on or read data from said recording area is equal to or less than a maximum processing time required to process said data, the area length of said recording area is determined as said minimum area length.

10. A storage apparatus according to claim 9, comprising:

measuring means for measuring the maximum value of the time required to access said recording area as an empty area or an area constituting a file, and the time required to record data on or read data from said recording area; and storage means for storing said measured maximum value of the time required to access said recording area, and said measured time required to record data on or read data from said recording area.

11. An error recovery processing method comprising the steps of:

accumulating a plurality of record requests or read requests;

recording data on or reading data from a recording medium in accordance with said accumulated record or read requests;

estimating, in the event of a data read error or record error, a remaining time available for error processing from the time required to execute said accumulated record or read requests; and selecting an error processing method according to said estimated remaining time from among a plurality of error processing methods requiring different lengths of time for error processing, and carrying out said selected error processing method.

12. An error recovery processing method comprising the steps of:

accumulating a plurality of record requests or read requests;

recording data on or reading data from a recording medium in accordance with said accumulated record or read requests;

estimating, in the event of a data read error or record error, a remaining time available for error processing from the time required to execute said accumulated record or read requests; and selecting, from among a plurality of error processing methods requiring different lengths of time for error processing, all or part of said plurality of error processing methods according to said estimated remaining time while considering a mode of operation prespecified for each record or read request, and carrying out said selected error processing method or methods.

13. An error recovery processing method according to claim 11, including an error processing method in which position data of an area where said error has occurred is recorded in a first defective area table, and after performing a reassignment operation to transfer data recorded or to be recorded in said error area to another area for recording therein, a check is carried out to determine whether or not the area whose position data has been recorded in said first defective area table is a nonusable area, as a result of which if it is determined that said area is nonusable, the position data of said area is recorded in a second defective area table, but if it is determined that said area is usable, the position data of said area is deleted from said first defective area table and said area is thus made usable.

14. An error recovery processing method according to claim 12, including an error processing method in which position data of an area where said error has occurred is recorded in a first defective area table, and after performing a reassignment operation to transfer data recorded or to be recorded in said error area to another area for recording therein, a check is carried out to determine whether or not the area whose position data has been recorded in said first defective area table is a nonusable area, as a result of which if it is determined that said area is nonusable, the position data of said area is recorded in a second defective area table, but if it is determined that said area is usable, the position data of said area is deleted from said first defective area table and said area is thus made usable thereafter.

15. An error recovery processing method according to claim 13, wherein the remaining time available for performing the check to determine whether or not the area whose position data has been recorded in said first defective area table is a nonusable area, is estimated from the time required to execute said record or read requests, and if said remaining time provides enough time to perform the check, said check is carried out.

16. An error recovery processing method according to claim 14, wherein the remaining time available for performing the check to determine whether or not the area whose position data has been recorded in said first defective area table is a nonusable area, is estimated from the time required to execute said record or read requests, and if said remaining time provides enough time to perform the check, said check is carried out.

17. A storage apparatus comprising:

request accumulating means for accumulating a plurality of record or read requests;

recording/reading means for recording data on or reading data from a recording medium in accordance with the record or read requests accumulated in said request accumulating means;

remaining time estimating means for estimating a remaining time available for error processing from the time required to execute the record or read requests accumulated in said request accumulating means; and error processing carrying out means capable of selectively carrying out an error processing method according to the remaining time estimated in said remaining time estimating means from among a plurality of error processing methods requiring different lengths of time to process a read error or record error occurring in said recording/reading means.

18. A storage apparatus comprising:

request accumulating means for accumulating a plurality of record requests or read requests;

recording/reading means for recording data on or reading data from a recording medium in accordance with the record or read requests accumulated in said request accumulating means;

remaining time estimating means for estimating a remaining time available for error processing from the time required to execute the record or read requests accumulated in said request accumulating means;

error processing carrying out means capable of selectively carrying out a plurality of error processing methods requiring different lengths of time to process a read error or record error occurring in said recording/reading means; and error processing method selection means for selecting an error processing method for each record request or read request according to the remaining time estimated in said remaining time estimating means from among said plurality of error processing methods capable of being carried out by said error processing carrying out means.

19. A storage apparatus according to claim 17, further comprising: defective area recording means having a first defective area table and second defective area table for recording position data of defective areas; and defective area discriminating means, and wherein:

position data of an area where an error has occurred in recording or reading is recorded in said first defective area table, and after performing a reassignment operation to transfer data recorded or to be recorded in said error area to another area for recording therein, a check is carried out by said defective area discriminating means to determine whether or not the area whose position data has been recorded in said first defective area table is a nonusable area, as a result of which if it is determined that said area is nonusable, the position data of said area is recorded in said second defective area table, but if it is determined that said area is usable, the position data of said area is deleted from said first defective area table and said area is thus made usable.

20. A storage apparatus according to claim 18, further comprising: defective area recording means having a first defective area table and second defective area table for recording position data of defective areas; and defective area discriminating means, and wherein:

position data of an area where an error has occurred in recording or reading is recorded in said first defective area table, and after performing a reassignment operation to transfer data recorded or to be recorded in said error area to another area for recording therein, a check is carried out by said defective area discriminating means to determine whether or not the area whose position data has been recorded in said first defective area table is a nonusable area, as a result of which if it is determined that said area is nonusable, the position data of said area is recorded in said second defective area table, but if it is determined that said area is usable, the position data of said area is deleted from said first defective area table and said area is thus made usable.

21. A storage apparatus according to claim 19, wherein, on the basis of the time required to execute said record or read requests, said remaining time estimating means estimates the remaining time available for performing the check to determine whether or not the area whose position data has been recorded in said first defective area table is a nonusable area, and if said remaining time provides enough time to perform the check, said check is carried out.

22. A storage apparatus according to claim 20, wherein, on the basis of the time required to execute said record or read requests, said remaining time estimating means estimates the remaining time available for performing the check to determine whether or not the area whose position data has been recorded in said first defective area table is a nonusable area, and if said remaining time provides enough time to perform the check, said check is carried out.

* * * * *